(12) United States Patent  (10) Patent No.: US 7,599,517 B2
Kogure et al.  (45) Date of Patent: Oct. 6, 2009

(54) DIGITAL WATERMARK DETECTING DEVICE AND METHOD THEREOF

(75) Inventors: Nakaba Kogure, Kanagawa (JP); Tomoo Yamakage, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 11/337,806

(22) Filed: Jan. 24, 2006

(65) Prior Publication Data

US 2006/0204030 A1  Sep. 14, 2006

(30) Foreign Application Priority Data

Mar. 11, 2005 (JP) ............................. 2005-068556

(51) Int. Cl.
*G06K 9/00*  (2006.01)

(52) U.S. Cl. ....................... 382/100; 382/276; 382/280

(58) Field of Classification Search .................. 382/100
See application file for complete search history.

(56) References Cited

U.S. PATENT DOCUMENTS

| | | | |
|---|---|---|---|
| 5,825,879 A | 10/1998 | Davis |
| 5,930,369 A | 7/1999 | Cox et al. |
| 5,940,135 A | 8/1999 | Petrovic et al. |
| 6,064,739 A | 5/2000 | Davis |
| 6,145,081 A | 11/2000 | Winograd et al. |
| 6,148,400 A | 11/2000 | Arnold |
| 6,175,627 B1 | 1/2001 | Petrovic et al. |
| 6,415,041 B1 | 7/2002 | Oami et al. |
| 6,469,743 B1 | 10/2002 | Cheney et al. |
| 6,741,723 B2 | 5/2004 | Yamakage et al. |
| 6,901,515 B1 | 5/2005 | Muratani |
| 6,952,486 B2 | 10/2005 | Yamakage et al. |
| 6,996,250 B2 | 2/2006 | Nakamura et al. |

(Continued)

FOREIGN PATENT DOCUMENTS

EP  0 923 027  6/1999

(Continued)

OTHER PUBLICATIONS

Van Schyndel et al., "Key Independent Watermark Detection", 1999, IEEE, pp. 580-585.

(Continued)

*Primary Examiner*—Tom Y Lu
(74) *Attorney, Agent, or Firm*—Nixon & Vanderhye, PC

(57) ABSTRACT

There is provided a digital watermarking detecting device that can accurately detect watermarking information weakened by an attack such as image cut-out, scaling or the like without increasing a calculation amount and a circuit scale. The digital watermarking detecting device includes an extractor 10 for extracting a signal of a specific frequency component from a watermarking embedded image, first orthogonal transformers 11A, 11B for calculating an orthogonally-transformed image of an extraction signal and an orthogonally-transformed image of a watermarking embedded image, amplitude adjusters 12A, 12B for adjusting the amplitudes of the two orthogonally-transformed images in accordance with the difference between the amplitude components of the two orthogonally-trans formed images, a compositor 13 for combining the two amplitude-adjusted orthogonally-transformed images, a second orthogonally-transformer 14 for subjecting the composite signal to orthogonal transformation to achieve a second orthogonally-transformed signal, and an estimator 15 for estimating the watermarking information on the basis of a peak appearing in the second orthogonally-transformed signal.

12 Claims, 18 Drawing Sheets

U.S. PATENT DOCUMENTS

| | | | |
|---|---|---|---|
| 7,123,744 | B2 | 10/2006 | Muratani et al. |
| 7,130,443 | B1 | 10/2006 | Werner et al. |
| 7,284,129 | B2 * | 10/2007 | Pelly et al. .................. 713/176 |
| 7,284,130 | B2 | 10/2007 | Asano et al. |
| 7,302,573 | B2 | 11/2007 | Kogure et al. |
| 7,471,807 | B2 | 12/2008 | Asano et al. |
| 7,515,731 | B2 | 4/2009 | Koto et al. |
| 2003/0091213 | A1 | 5/2003 | Yamakage et al. |
| 2003/0108219 | A1 | 6/2003 | Muratani et al. |
| 2004/0117629 | A1 | 6/2004 | Koto et al. |
| 2004/0136531 | A1 | 7/2004 | Asano et al. |
| 2004/0194126 | A1 | 9/2004 | Kogure et al. |
| 2005/0053259 | A1 | 3/2005 | Asano et al. |
| 2005/0094848 | A1 | 5/2005 | Carr et al. |
| 2006/0204031 | A1 | 9/2006 | Kogure et al. |
| 2007/0195988 | A1 | 8/2007 | Kogure et al. |
| 2007/0217606 | A1 | 9/2007 | Asano et al. |

FOREIGN PATENT DOCUMENTS

| | | |
|---|---|---|
| EP | 1 001 368 | 5/2000 |
| EP | 1 220 152 | 7/2002 |
| JP | 60-68703 | 4/1985 |
| JP | 11-346302 | 12/1999 |
| JP | 2000-165654 | 6/2000 |
| JP | 2000-236432 | 8/2000 |
| JP | 2001-16438 | 1/2001 |
| JP | 2001-16538 | 1/2001 |
| JP | 2001-218044 | 8/2001 |
| JP | 2001-224029 | 8/2001 |
| JP | 2001-518651 | 10/2001 |
| JP | 2001-527660 | 12/2001 |
| JP | 2002-77589 | 3/2002 |
| JP | 2002-185762 | 6/2002 |
| JP | 2002-191033 | 7/2002 |
| JP | 2002-519916 | 7/2002 |
| JP | 2002-325233 | 11/2002 |
| JP | 2004-64319 | 2/2004 |
| WO | 99/18723 | 4/1999 |
| WO | 01/24113 | 4/2001 |

OTHER PUBLICATIONS

Bijan G. Mobasseri, et al. "Direct Sequence Watermarking of Digital Video Using m- frames", IEEE, Comput. Soc., XP010308533, vol. 2, Oct. 4, 1998, pp. 399-403.

Tae-Yun Chung et al., "Digital Watermarking for Copyright Protection of MPEG2 Compressed Video", IEEE Transactions on Consumer Electronics, XP011008532, vol. 44, No. 3, Aug. 1998, pp. 895-901.

Husrev T. Sencar et al., "A Robust Type-III Data Hiding Technique Against Cropping & Resizing Attacks", IEEE International Symposium on Circuits and Systems, XP002398738, vo., 2, May 26, 2002, pp. II-444-II-447.

J.J.K. O'Ruanaidh et al., "Phase Watermarking of Digital Images", Proceedings of the International Conference on Image Processing (ICIP), XP010202375, vol. 1, Sep. 16, 1996, pp. 239-242.

Saraju P. Mohanty, "Digital Watermarking: A Tutorial Review", (Online) Retrieved from Internet, XP-002386431, 1999, pp. 1-24.

Mitchell D. Swanson et al., Transparent Robust Image Processing (ICIP) Lausanne, vol. 1, XP010202368, Sep. 16, 1996, pp. 211-214.

Alejandro Loboguerrero et al., "Implementation d'un systeme' de Tatouage Pour la Transmission de Donees", XXIVe 'mes Journess d'Etrude sur la Parole, Nancy, XP-002386432, Jun. 24, 2002.

Raymond B. Wolfgang et al., "Perceptual Watermarks for Digital Images and Video", Proceedings of the IEEE, vol. 87 No. 7, XP-011044240, Jul. 1999, pp. 1108-1126.

Damien Delannay et al., "Compensation of Geometrical Deformations for Watermark Extraction in the Digital Cinema Application", Proceedings of the SPIE, vol. 4314, XP-002960804, Jan. 22, 2001, pp. 149-157.

Jeffrey A. Bloom, et al. "Copy Protection for DVD Video", Proceedings of the IEEE, vol. 87, No. 7, XP-011044224, Jul. 1999, pp. 1267-1276.

Frank Hartung et al., "Digital Watermarking of MPEG-2 Coded Video in the Bitstream Domain", 1997 IEEE, XP-010225693, vol. 4, Apr. 21, 1997, pp. 2621-2624.

R. Lancini et al. A Robust Video Watermarking Technique in the International Symposium on Video/Image Processing and Multimedia Communications, XP-010598723, Jun. 16-19, 2002, pp. 251-256.

* cited by examiner

FIG.16
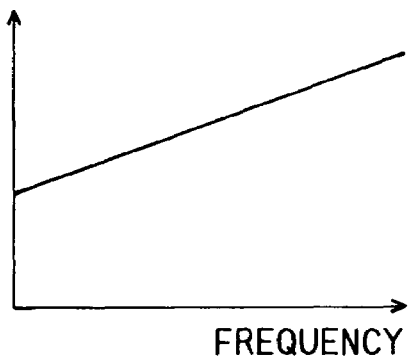
AMPLITUDE 7A (EXTRACTION SIGNAL)
FREQUENCY
AMPLITUDE ADJUSTMENT →
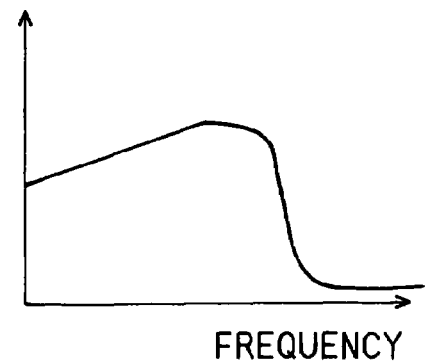
AMPLITUDE 7B (EXTRACTION SIGNAL)
FREQUENCY
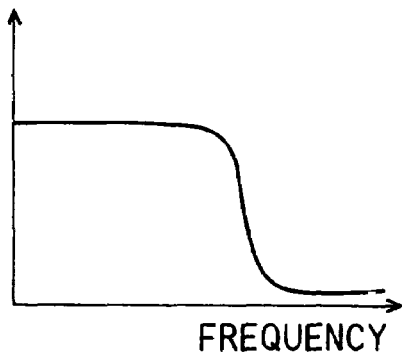
AMPLITUDE 8A (WATERMARKING EMBEDDED IMAGE)
FREQUENCY

DIGITAL WATERMARK DETECTING DEVICE AND METHOD THEREOF

CROSS-REFERENCE TO RELATED APPLICATIONS

This application is based upon and claims the benefit of priority from the prior Japanese Patent Application No. 2005-68556, filed on May 11, 2005; the entire contents of which are incorporated herein by reference.

TECHNICAL FIELD

The present invention relates to a digital watermarking detecting device that is effective to prevent unjust copying of a digital video signal supplied through a recording medium, for example, and a method for the device.

BACKGROUND OF THE INVENTION

In connection with propagation of a device for recording and reproducing digital image data such as a digital VTR, DVD (digital versatile disc) or the like, a large number of digital motion pictures that can be reproduced by such a device as described above have been supplied. Furthermore, various digital motion pictures are being distributed through digital television broadcast through the Internet, a broadcast satellite, a communication satellite, etc., and users are allowed to use high-quality digital motion pictures.

With respect to digital motion pictures, high-quality copies thereof can be easily made at the digital signal level. Therefore, when neither copy inhibition nor copy control is carried out on these digital motion pictures, there is a risk that they are copied without restriction. Accordingly, in order to prevent unjust copying of digital motion pictures or control the number of generations of copying by regular users, there has been considered a method of adding copy controlling information to digital motion pictures and preventing unjust copying or restricting copying by using the additional information concerned.

A digital watermarking (electronic watermark) technique is known as a technique of superposing another different additional information on digital motion pictures as described above. According to the digital watermarking technique, various information such as identification information on the owner of copyright of a content (digitalized voice, music, motion picture, still picture or the like) and users of the content, right information of the copyright owner, the using condition of the content, secrete information needed to use the content, the information such as the copy controlling information described above, etc. (hereinafter referred to as "watermarking information") is embedded in the content concerned, and copyright protection containing control of use and copy control is afterward carried out by detecting the watermarking information from the content as occasion demands or secondary use is promoted.

Various method have been proposed as a digital watermarking system, and a system using a spread spectrum technique is known as one of these digital watermarking systems. According to this system, watermark information is embedded in digital motion pictures according to the following procedure.

[Step E1]
An image signal is multiplied by PN (Pseudorandom Noise) sequence to carry out spread spectrum modulation.

[Step E2]
The image signal that has been subjected to spread spectrum modulation is subjected to frequency-transformation (for example, DCT transformation).

[Step E3]
Watermarking information is embedded by changing the value of a specific frequency component.

[Step E4]
Inverse frequency transformation (for example, IDCT transformation) is carried out.

[Step E5]
Inverse spread spectrum modulation is carried out (the image signal is multiplied by the same PN sequence as step E1).

Detection of the watermarking information from the digital motion picture in which the watermarking information is embedded as described above is carried out according to the following procedure.

[Step D1]
An image signal is multiplied by PN (Pseudorandom Noise) sequence (the same PN sequence as step E1) to carry out spread spectrum modulation.

[Step D2]
The image signal that has been subjected to the spread spectrum modulation is subjected to frequency transformation (for example, DCT transformation).

[Step D3]
The value of a specific frequency component is noted and watermarking information embedded is extracted.

A technique for detecting watermarking information through the correlation (mutual correlation) between an extraction signal achieved by extracting an input image signal and an image having a watermarking embedded therein has been proposed as a method for detecting digital watermarking embedded in a motion picture in which an image signal is embedded according to watermarking information. For example, this technique is disclosed in Patent Document 1 (claim 2, FIG. 7 of JP-A-2002-325233) and Patent Document 2 (claim 1, FIG. 1 of JP-A-2002-218404).

When digital watermarking is applied to prevent unauthorized use, digital copyrighted works are required to have such a property (robustness) that watermarking information is not lost or falsified by various kinds of operations or intentional attacks which are assumed to be normally conducted on digital copyrighted works. Cut-out of images, scaling (enlargement/reduction), etc. may be considered as an attack of disenabling detection of watermarking information from a digital image in which the watermarking information is embedded.

According to the conventional technique, when an image suffering such an attack is input, the processing of estimating PN sequence used in step E1 when watermarking information is embedded is first carried out when the watermarking information is detected, and synchronization of the PN sequence is restored. Thereafter, the processing of the steps D1 to D3 is carried out to extract the embedded watermarking information. When the synchronization of the PN sequence is restored from only the image signal, it is required to carry out such a searching operation that the processing is tried by using plural candidates and a candidate for which the detection can be carried out is adopted as the watermarking information. Therefore, this method has a problem that the calculation amount and the circuit scale are increased. Furthermore, with respect to an image suffering an attack, the watermarking information of the image is weakened, and thus even when cut-out or scaling of the image is found out and the detection adapted to the cut-out or scaling of the image is carried out, the watermarking information cannot be detected.

BRIEF SUMMARY OF THE INVENTION

The present invention has an object to provide a digital watermarking detecting device that can more accurately detect watermarking information weakened by an attack such as image cut-out, scaling or the like without increasing a calculation amount and a circuit scale, and a method for the digital watermarking detecting device.

According to embodiments of the present invention, a digital watermarking detecting device for detecting watermarking information of a watermarking-embedded image when a specific frequency component signal extracted from an embedding target image is converted according to the watermarking information and the watermarking-embedded image having the watermarking information electrically embedded therein is generated, comprises: an extracting processor unit for extracting an extraction signal of the specific frequency component from the watermarking-embedded image by the same extraction method as the digital watermarking embedding device; a first orthogonal transforming processor unit for calculating an orthogonally-transformed image of the extraction signal and an orthogonally-transformed image of the watermarking-embedded image; an amplitude adjusting processor unit for adjusting both or one of the amplitudes of the two orthogonally-transformed images in accordance with the difference between the amplitude components of the two orthogonally-transformed images; a composition processor unit for combining the two orthogonally-transformed images thus adjusted in amplitude to achieve a composite signal; a second orthogonal transforming processor unit for subjecting the composite signal to orthogonal transformation or inverse orthogonal transformation to achieve a second orthogonally-transformed signal; and a watermarking information estimating processor unit for estimating the watermarking information on the basis of a peak appearing in the second orthogonally-transformed signal.

According to the embodiments of the present invention, the watermarking information can be accurately detected irrespective of an attack such as image cut-out, scaling or the like without increasing a calculation amount and a circuit scale.

BRIEF DESCRIPTION OF THE DRAWINGS

FIG. 16 is a diagram showing a fourth amplitude adjusting method;

DETAILED DESCRIPTION OF THE INVENTION

FIRST EMBODIMENT

A digital watermarking embedding device and a digital watermarking detecting device according to a first embodiment of the present invention will be described.

(Digital Watermarking Embedding Device)

First, the digital watermarking embedding device according to the first embodiment will be described with reference to FIGS. 7 and 9.

Figure 7:
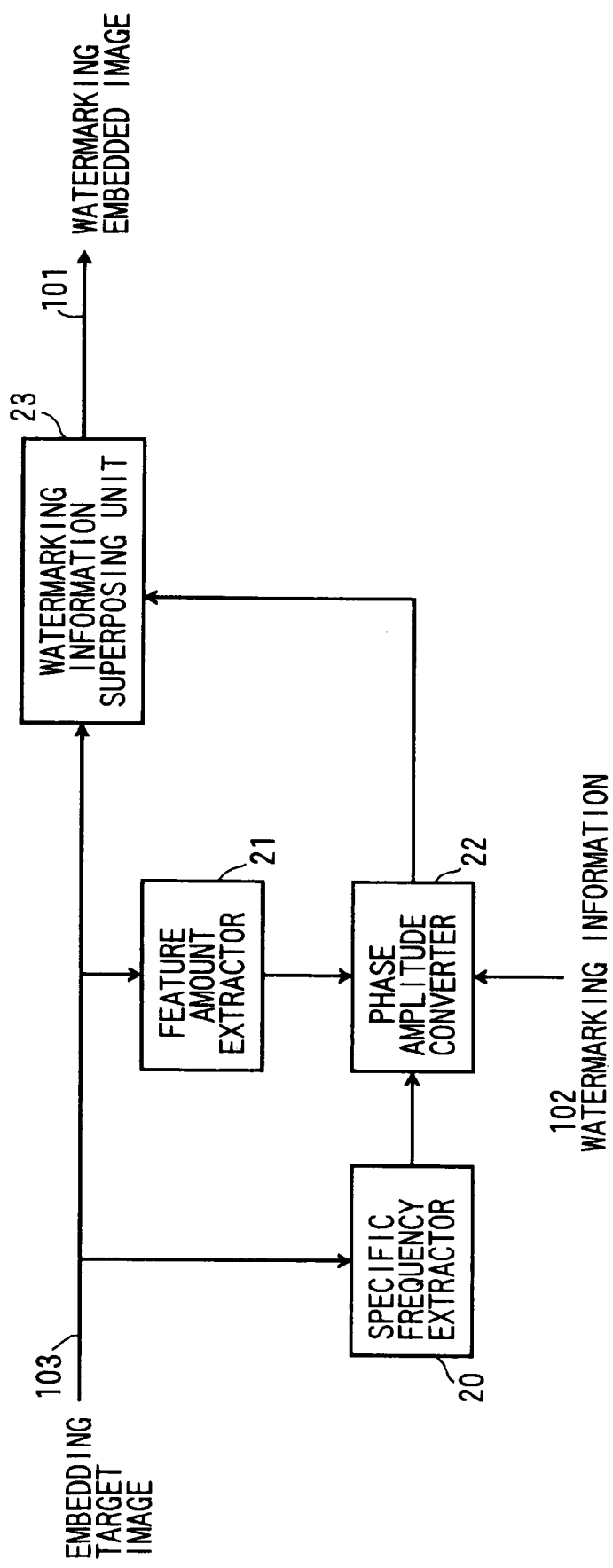
FIG. 7 is a block diagram showing the construction of a digital watermarking embedding device according to the first embodiment.

FIG. 7 is a block diagram showing the basic construction of the digital watermarking embedding device.

A digitalized image signal of a motion picture or still picture is input to the digital watermarking embedding device as an image in which watermarking information should be embedded (hereinafter referred to as "embedding target image 103". The embedding target image signal 103 may contain both of a bright signal and a color difference signal, however, it may contain only the brightness signal. The embedding target image signal 103 is branched to three parts and input to a specific frequency component extractor 20, a feature amount extractor 21 and a watermarking information superposing portion 23.

The specific frequency component extractor 20 comprises a digital filter of the frequency area, for example, a low pass filter or high pass filter that has a predetermined cut-off frequency, or a band pass filter having a predetermined passband center frequency, and extracts a specific frequency component, for example, a relatively high frequency component from the embedding target image signal 103. In the following description, an output signal from the specific frequency component extractor 20 will be referred to as "specific frequency component signal".

The specific frequency component output from the specific frequency component extractor 20 is converted in phase and amplitude by a phase and amplitude converter 22. In this case, only the phase may be converted or only the amplitude may be converted. Watermarking information 102 corresponding to digital information to be embedded in the embedding target image signal 103 is supplied to the phase and amplitude converter 22.

The phase and amplitude converter 22 is designed so as to subject a specific frequency component signal to phase conversion of a predetermined inherent phase conversion amount and, amplitude conversion of a predetermined inherent amplitude conversion amount. Specifically, the phase conversion of the phase amplitude converter 22 is implemented by a single or plural digital phase shifters, and the phase conversion amount corresponds to the phase shift amounts of the phase shifters.

Figure 9:
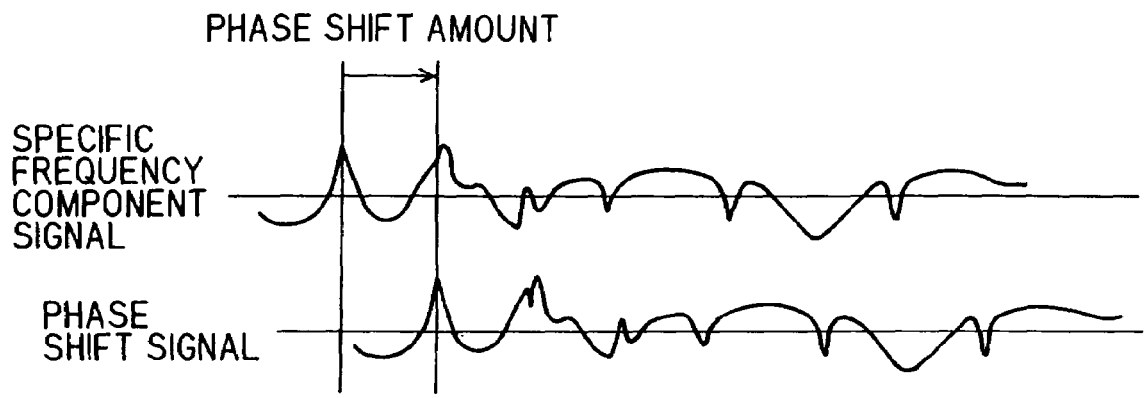
FIG. 9 is a diagram showing phase shift of an extracting signal.

FIG. 9 is a diagram showing the aspect of the phase shift carried out by a phase converter 112. In this case, the specific frequency component signal is simply phase-shifted while keeping the waveform thereof. Specifically, the amplitude conversion of the phase and amplitude converter 22 is carried out by a single or plural exclusive OR circuits or digital multipliers, and the amplitude conversion amount is a coefficient to be multiplied to the input specific frequency component signal. Watermarking information 102 is input to the phase and amplitude converter 22, and the phase conversion amount (phase shift amount) of the phase and amplitude converter 22 and the amplitude conversion amount (coefficient) are controlled according to the watermarking information 102.

Furthermore, a feature amount of the embedding target image signal 103, for example, activity representing the complexity degree of an image is extracted by a feature amount extractor 21. The information on the feature amount is input to the phase and amplitude converter 22. In the phase and amplitude converter 22, the phase conversion amount (phase shift amount) and the amplitude conversion amount (coefficient) are controlled in accordance with the input feature amount. The feature extractor 21 is not indispensable, and it may be omitted.

The specific frequency component signal that has been subjected to phase conversion and amplitude conversion by the phase and amplitude converter 22 is supplied as an embedding signal by the watermarking information superposing portion 23 comprising a digital adder, and superposed on the embedding target image signal 103. That is, the specific frequency component signal extracted by the specific frequency component extractor 20 is subjected to phase conversion and amplitude conversion inherent to the digital watermarking embedding device by the phase and amplitude converter 22, and also one or both of the phase conversion amount and the amplitude conversion amount are controlled by the watermarking information 102. Therefore, the watermarking embedded image 101 in which the watermarking information 102 is embedded in the embedding target image signal 103 is generated in the watermarking information superposing portion 23.

The specific frequency component signal which is extracted by the specific frequency component extractor 20 and subjected to phase and amplitude conversion by the phase and amplitude converter 22 may exist over plural channels. That is, in this case, specific frequency component signals of plural channels are superposed on the embedding target image signal 103 in the watermarking information superposing portion 23.

As described above, the image signal having the watermarking information embedded therein (hereinafter referred to as "watermarking embedded image signal 101") is recorded in a recording medium by a digital image recording and reproducing device such as a DVD system or the like, or transmitted through a transmission medium such as the Internet, a broadcast satellite, a communication satellite or the like.

(Digital Watermarking Detecting Device)

A first embodiment of a digital watermarking detecting device when the watermarking embedded image signal 101 described above is detected will be described with reference to the drawings.

The digital watermarking detecting device according to the first embodiment will be described with reference to FIGS. 1, 3, 5 and 9 to 19.

(1) Construction of Digital Watermarking Detecting Device

Figure 1:
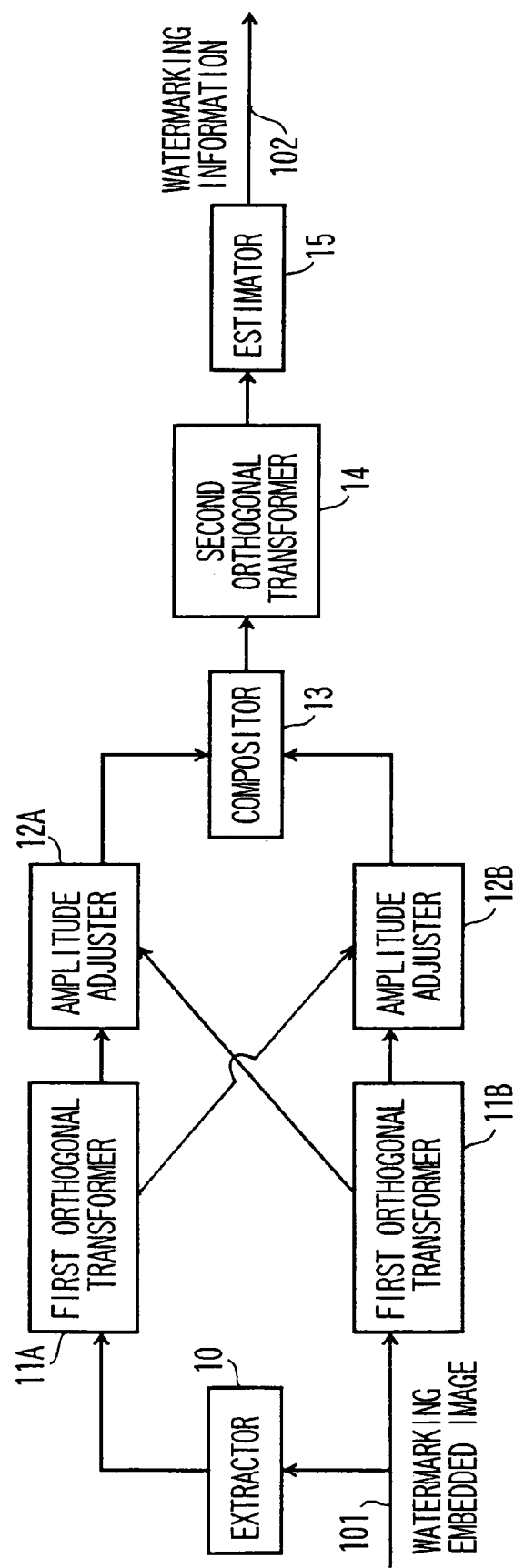
FIG. 1 is a block diagram showing the construction of a digital watermarking detecting device according to a first embodiment of the present invention.

FIG. 1 shows the construction of a digital watermarking detecting device according to the first embodiment.

The watermarking embedded image signal 101 of FIG. 1 in which the specific frequency component signal is controlled to be embedded according to the watermarking information 102 by the digital watermarking embedding device described above is input through a recording medium or transmission medium. It is assumed that a digital signal "1" or "0" is embedded as watermarking information.

Only a specific component is extracted from the watermarking embedded image signal 101 by an extractor 10. The extractor 10 is a digital filter of the same frequency area as the specific frequency component extractor used in the digital watermarking embedding device described above, for example, a low pass filter or high pass filter that has a predetermined cut-off frequency, or a band pass filter having a predetermined passband center frequency, and extracts a specific frequency component, for example, a relatively high frequency component signal from the watermarking embedded image signal 101. The signal thus extracted will be referred to as "extraction signal").

The extraction signal extracted by the extractor 10 is subjected to orthogonal transformation processing such as orthogonal transformation or the like by a first orthogonal transformer 11A, and the watermarking embedded image signal 101 is subjected to orthogonal transformation processing such as orthogonal transformation or the like by a first orthogonal transformer 11B. There may be also considered such a situation that the extractor extracts all the frequency components.

The amplitude component of the first orthogonal transformer 11A is adjusted in amplitude by an amplitude adjuster 12A so that the difference thereof from the amplitude component of the first orthogonal transformer 11B is suppressed to a predetermined range. Likewise, the amplitude component of the first orthogonal transformer 11B is adjusted in amplitude by an amplitude adjuster 12B so as to approach to the amplitude component of the first orthogonal transformer 11A.

The two signals after the amplitude adjustment described above are subjected to complex composition by a compositor 13.

The composite signal after the complex composition is subjected to orthogonal transformation or inverse orthogonal transformation by the second orthogonal transformer 14. The orthogonal transformation in this case is required to be paired with the transformation in the first orthogonal transformation, and when Fourier Transform is used for the first orthogonal transformation, the second orthogonal transformation must be Fourier Transform or inverse Fourier Transform.

The composite signal after the second orthogonal transformation is input to an estimator 15. A method of the estimator 15 estimating the watermarking information 102 from the composite signal after the transformation will be described with reference to FIGS. 9 and 10. It is assumed that a digital signal "1" or "0" is embedded as the watermarking information as described above.

As shown in FIG. 9, the correlation between the transformed composite signal being phase-shifted and the original non-phase-shifted composite signal is calculated. The relationship between the mutual correlation value and the phase shift amount is shown in FIG. 10.

Figure 10:
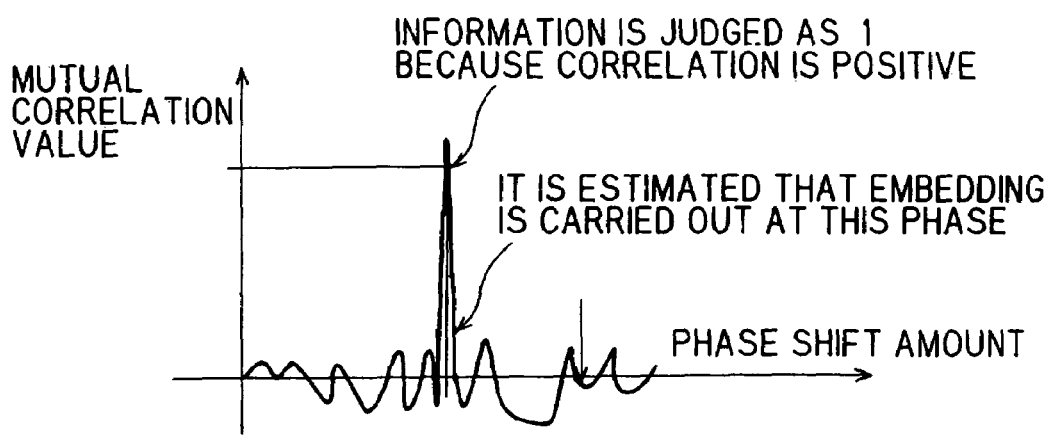
FIG. 10 is a diagram showing examples of peak search of a correlation value and watermarking information detection in the digital watermarking detecting device.

As shown in FIG. 10, when variation of the mutual correlation value is observed, a peak appears at the position of some phase shift amount, and the polarity of the peak represents the watermarking information 102. For example, when the watermarking embedded image signal 101 is suffering a scaling attack, the phase shift amount of the specific frequency component signal thus attacked is made different from the phase shift amount given to the specific frequency component signal in the digital watermarking embedding device.

Therefore, in this embodiment, the phase shift amount is continuously or stepwise controlled by the estimator 15, a peak of the mutual correlation value output in connection with the above control is searched, and the watermarking information is estimated and detected on the basis of the polarity of the peak thus searched. The peak of the mutual correlation value takes one of positive and negative values in accordance with the value of the watermarking information. For example, in the case of FIG. 10, when the peak has a positive value, the watermarking information is judged as "1". When the peak has a negative value, the watermarking information is judged as "0". As described above, for the image suffering the scaling attack, the watermarking information 102 detected by the estimator 15 is output.

As described above, according to this embodiment, the extraction signal is extracted from the watermarking embedded image signal, and the watermarking information is detected on the basis of the mutual correlation result of the phase restricted correlation between the extraction signal and the watermarking embedded image signal. In this case, the peak of the correlation value can be searched by carrying out the correlation calculation while varying the phase, and thus the watermarking information can be also easily detected from the embedded image signal suffering the scaling attack.

(2) Phase Restricted Correlation Method

Figure 11:
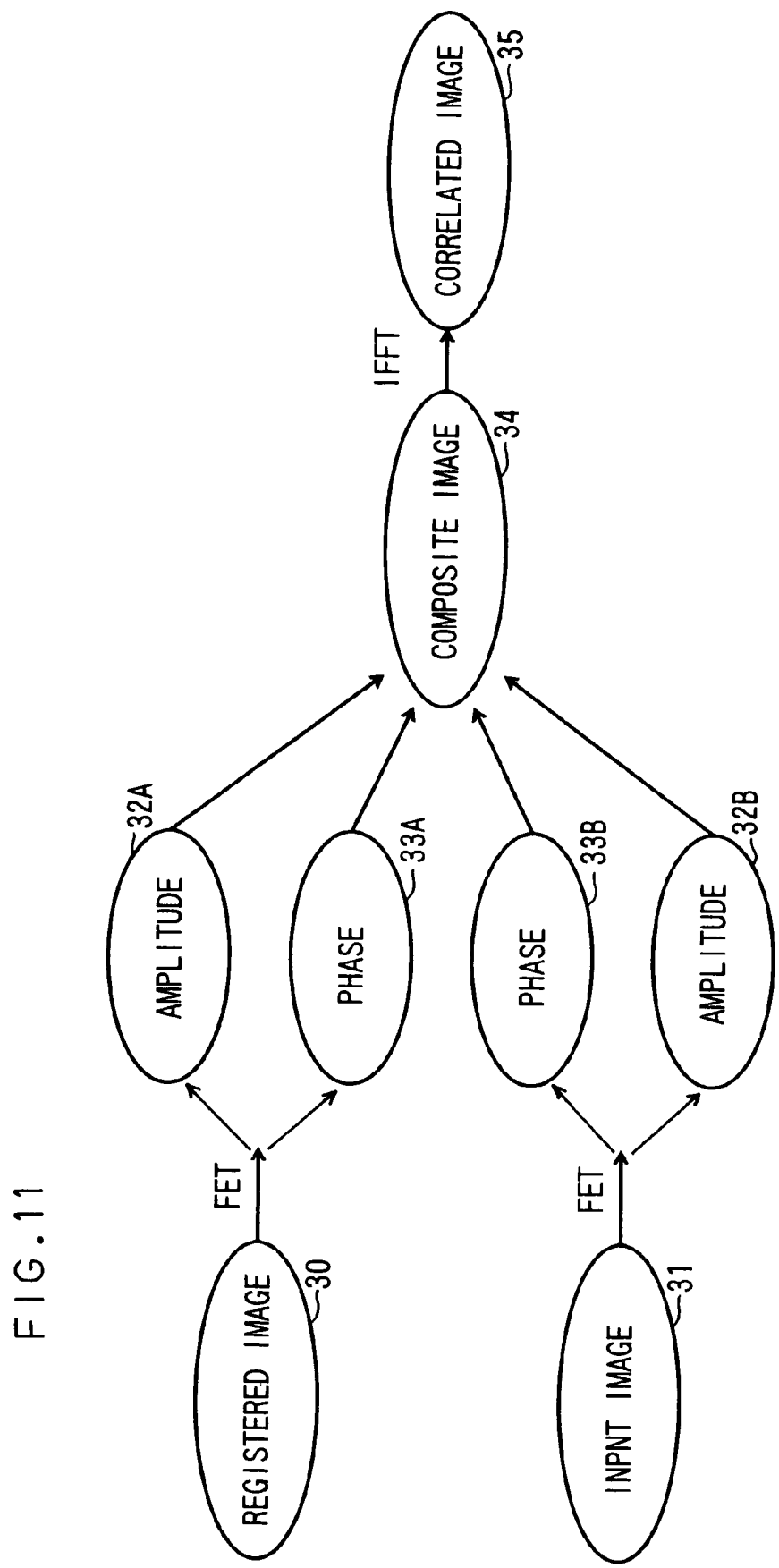
FIG. 11 is a diagram showing the concept of a phase restricted correlating method.

The correlation method that restricts the phase as described above is called as "phase restricted correlation method", and this method will be described hereunder with reference to FIG. 11.

The phase restricted correlation: POC (Phase Only Correlation) is a method of calculating the correlation (similarity) of an input image 31 to be allocated with an original registered image 30.

First, the digitally-signalized registered image 30 is mathematically processed by orthogonal transformation to be decomposed into amplitude 32A (shading data) and phase 33A (contour data of an image). Furthermore, the digitally-signalized input image 31 is also mathematically processed by orthogonal transformation to be decomposed into amplitude 32B (shading data) and phase 33B (contour data of an image).

Secondly, the amplitude 33B of the decomposed registered image 30 is subjected to amplitude compression. This is because this algorithm is an algorithm for collation with the phase 33B of the input image 31, that is, an algorithm for image processing of the correlation by using only the phase information without using the amplitude information containing no shape information in the above two information.

Likewise, the amplitude 32B of the decomposed input image 31 is also subjected to amplitude compression. A method of fixing the amplitude to 1 over all the frequencies is generally used as the amplitude compression method.

Thirdly, a composite image 34 is formed from the two phase information of the registered image 30 and the input image 31, and inverse orthogonal transformation is carried out on the composite image to thereby achieve a correlated image 35.

The phase restricted correlation is completely different from the conventional two-dimensional correlation method and the conventional feature extracting method that use the amplitude information, and has a feature that it is a high resistance to external disturbance and has no large error.

(2-1) Conventional Amplitude Compression Method

In the conventional phase restricted correlation, the amplitude is fixed to 1 over all the frequencies as described above.

However, when an attack such as image cut-out, scaling or the like is assumed, the amplitude error (difference) between before and after attacked is expanded because the amplitude is fixed to 1, and thus it is estimated that the resistance to the attack is not high.

Therefore, the two amplitude values to be correlated with each other are adjusted so as to approach to each other in order to prevent the amplitude error from expanding, whereby it is expected that the resistance to the attack is increased.

An example of an amplitude adjusting unit will be described hereunder.

(2-2) Amplitude Adjusting Method of this Embodiment

An amplitude adjusting method for adjusting the amplitude of the orthogonally-transformed images of an extraction signal and a watermarking embedded image in this embodiment will be described in turn.

(2-2-1) First Amplitude Adjusting Method

A first amplitude adjusting method of the amplitudes of the orthogonally-transformed images of the extraction signal and the watermarking embedded image will be described with reference to FIG. 13.

Figure 13:
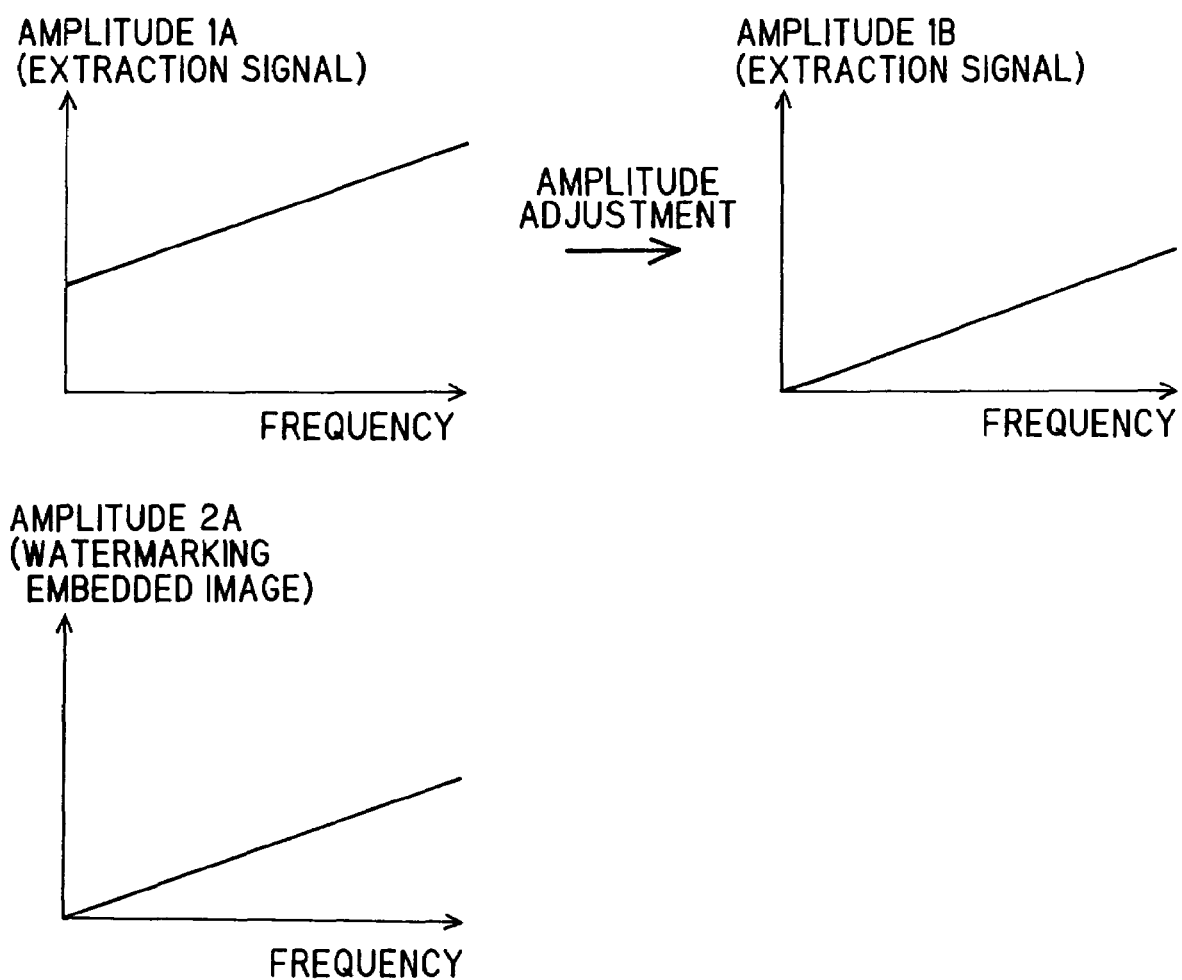
FIG. 13 is a diagram showing a first amplitude adjusting method.

FIG. 13 is a diagram showing an example of an amplitude adjustment of suppressing the magnitude difference between the amplitude components of the orthogonally-transformed images of the extraction signal and the watermarking embedded image to a predetermined range, and the amplitude is adjusted by the amplitude adjuster 12A of the extraction signal.

The magnitude of the amplitude of the orthogonally-transformed image of the extraction signal input to the amplitude adjuster 12A (hereinafter referred to merely as "extraction signal amplitude") 1A is calculated, and then compared with the magnitude of the amplitude 2A of the orthogonally-transformed image of the watermarking embedded image (hereinafter referred to merely as "watermarking embedded image amplitude"). Since the amplitude 1A of the extraction signal is larger than the amplitude 2A of the watermarking embedded image as shown in FIG. 13, the magnitude of the amplitude 1A of the extraction signal is adjusted by amplitude adjustment so that the difference in magnitude between the amplitude 1A of the extraction signal and the amplitude 2A of the watermarking embedded image is suppressed to a predetermined range.

In this example, the amplitude adjustment of the amplitude adjuster 12A is carried out, however, the same amplitude adjustment may be carried out on the amplitude adjuster 12B. Furthermore, the same amplitude adjustment may be carried out in some specific frequency band.

(2-2-2) Second Amplitude Adjusting Method

A second amplitude adjusting method of the amplitudes of the orthogonally-trans formed images of the extraction signal and the watermarking embedded image will be described with reference to FIG. 14.

Figure 14:
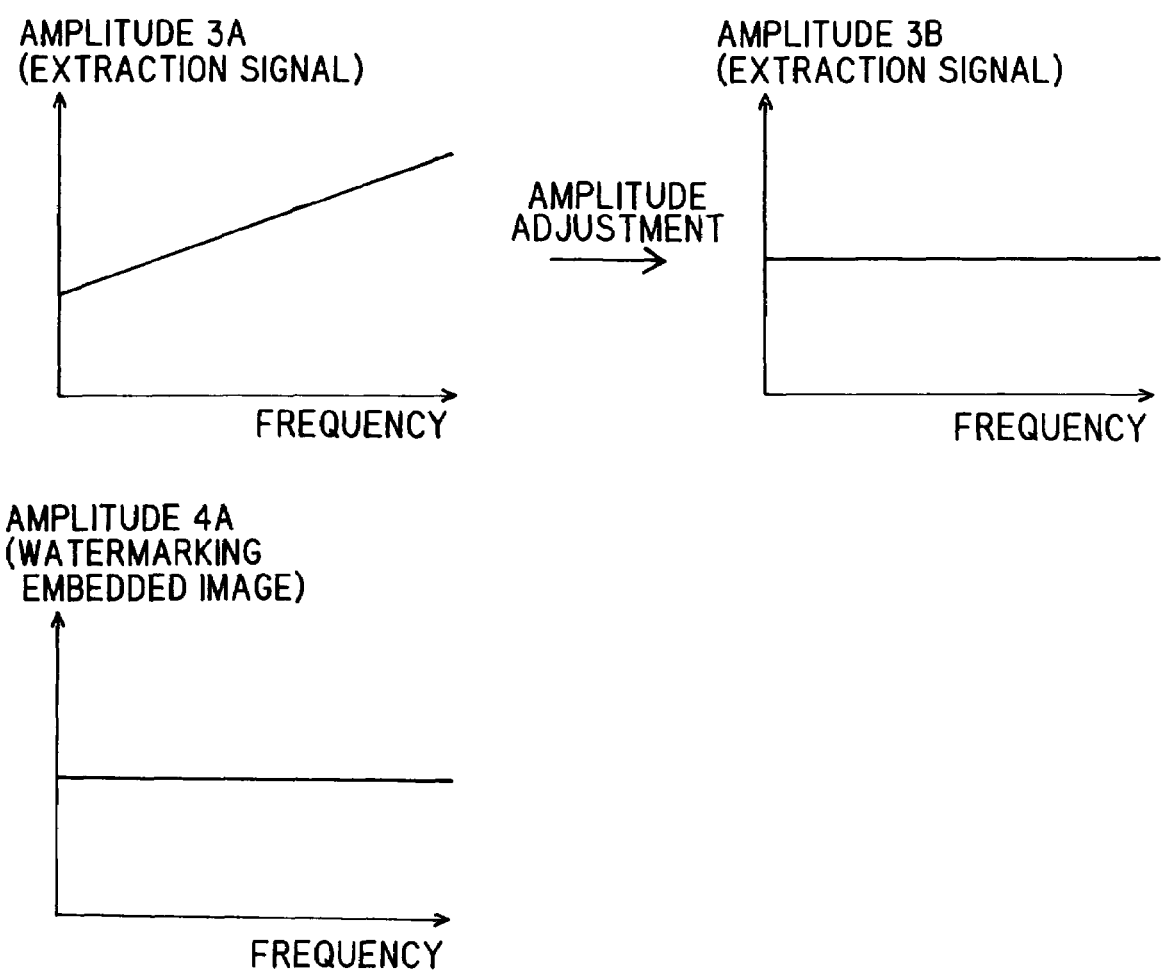
FIG. 14 is a diagram showing a second amplitude adjusting method.

FIG. 14 is a diagram showing an example of the amplitude adjustment of suppressing the difference in gradient between the amplitude components of the two orthogonally-transformed images to a predetermined range, and the amplitude is adjusted by the amplitude adjuster 12A of the extraction signal.

The gradient of the amplitude 3A is calculated from the extraction signal input to the amplitude adjuster 12A, and compared with the gradient of the amplitude 4A of the watermarking embedded image. Since the amplitude 3A of the extraction signal is larger than the amplitude 4A of the watermarking embedded image as shown in FIG. 14, the magnitude of the amplitude 3A of the extraction signal is adjusted by amplitude adjustment so that the difference in gradient between the amplitude 3A of the extraction signal and the amplitude 4A of the watermarking embedded image is suppressed to a predetermined range.

In this example, the amplitude adjustment of the amplitude adjuster 12A is carried out. However, the same amplitude adjustment may be carried out with respect to the amplitude adjuster 12B. Furthermore, the same amplitude adjustment may be carried out in some specific frequency band.

(2-2-3) Third Amplitude Adjusting Method

A third amplitude adjusting method of the amplitudes of the orthogonally-transformed images of the extraction signal and the watermarking embedded image will be described with reference to FIG. 15.

Figure 15:
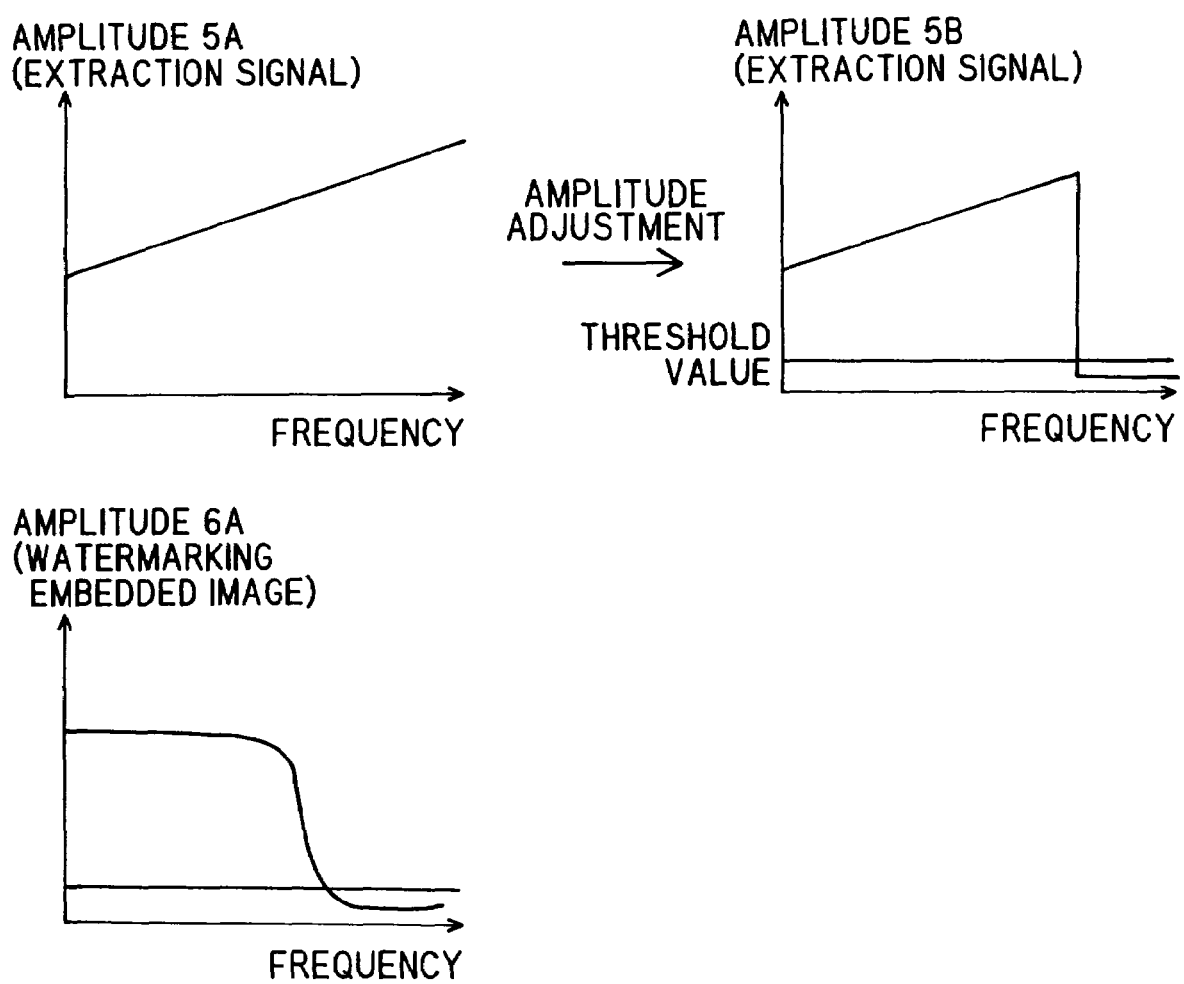
FIG. 15 is a diagram showing a third amplitude adjusting method.

FIG. 15 is a diagram showing an example of amplitude adjustment in which when there is a frequency at which the magnitude of the amplitude of the orthogonally-transformed image of the extraction signal or the watermarking embedded image is smaller than a predetermined threshold value, the magnitude of each of the two amplitudes is reduced to be less than the predetermined threshold value at the frequency concerned. In this example, the amplitude is adjusted by the amplitude adjuster 12A of the extraction signal.

It is checked whether there is any frequency at which the magnitude of each of the amplitude 5A of the extraction signal and the amplitude 6A of the watermarking embedded image is smaller than a predetermined threshold value. In this example, it is found that the amplitude 6A is smaller than the threshold value at high frequencies. Therefore, the amplitude at the high frequencies of the amplitude 5B of the extraction signal is reduced to be less than the threshold value by amplitude adjustment.

In this example, the amplitude adjustment of the amplitude adjuster 12A is carried out, however, the same amplitude adjustment may be carried out on the amplitude adjuster 12B. Furthermore, In the above example, the high frequency component is subjected to the amplitude adjustment, however, the same amplitude adjustment may be carried out at some specific frequency band.

(2-2-4) Fourth Amplitude Adjusting Method

A fourth amplitude adjusting method for the amplitudes of the orthogonally-transformed images of the extraction signal and the watermarking embedded images will be described with reference to FIG. 16.

FIG. 16 is a diagram showing an example of the amplitude adjustment of applying a filter to the amplitude of the orthogonally-transformed image of the extraction signal or the watermarking embedded image so that the difference between the two amplitudes is suppressed to a predetermined range. In this example, the amplitude is adjusted by the amplitude adjuster 12A of the extraction signal.

A digital filter having the same amplitude characteristic as the amplitude 8A of the watermarking embedded image is applied to the amplitude 7A of the extraction signal to carry out the amplitude adjustment, thereby achieving the amplitude 7B of the extraction signal.

In this example, the amplitude adjustment of the amplitude adjuster 12A is carried out, however, the same amplitude adjustment may be carried out on the amplitude adjuster 12B. Furthermore, in the above example, the amplitude adjustment is carried out by applying filtering over all the frequency band. However, the same amplitude adjustment may be carried out in some frequency band.

(2-2-5) Fifth Amplitude Adjusting Method

A fifth amplitude adjusting method for the amplitudes of the orthogonally-transformed images of the extraction signal and the watermarking embedded image will be described with reference to FIG. 17.

Figure 17:
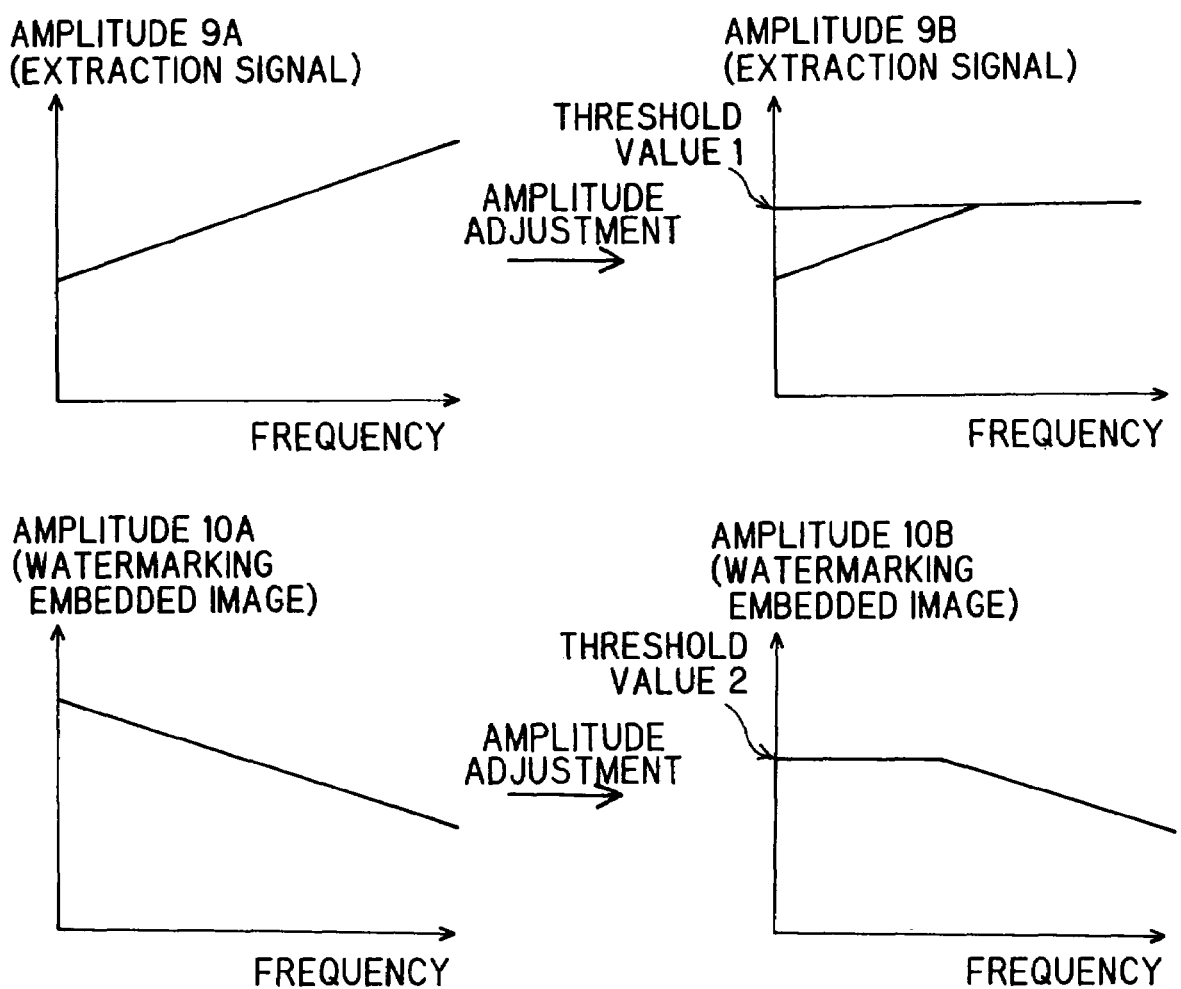
FIG. 17 is a diagram showing a fifth amplitude adjusting method.

FIG. 17 is a diagram showing an example of the amplitude adjustment that when the amplitude of the orthogonally-transformed image of the extraction signal exceeds a specific threshold value (hereinafter referred to as "threshold value 1"), the amplitude is fixed to the threshold value 1, and also when the amplitude of the orthogonally-transformed image of the watermarking embedded image exceeds a threshold value (hereinafter referred to as "threshold value 2"), the amplitude is fixed to the threshold value 2. The threshold value 1 and the threshold value 2 are different from each other.

The amplitude 9A of the extraction signal is compared with the threshold value 1, and it is judged whether the amplitude 9A exceeds the threshold value 1. If the amplitude 9A exceeds the threshold value 1, the amplitude 9A is fixed to the threshold value 1. Furthermore, the amplitude 10A of the watermarking embedded image is compared with the threshold value 2. If the amplitude 10A is judged to exceed the threshold value 2, the amplitude 10A is fixed to the threshold value 1. Accordingly, the amplitude 9B of the extraction signal and the amplitude 10B of the watermarking embedded image are achieved.

The threshold value 1 and the threshold value 2 may be set to different values or the same value. Furthermore, in the above example, the amplitude is compared with the threshold value over all the frequency band. However, the same amplitude adjustment may be carried out in some specific frequency band.

(2-2-6) Sixth Amplitude Adjusting Method

A sixth amplitude adjusting method for the amplitudes of the extraction signal and the watermarking embedded image will be described with reference to FIG. 18.

Figure 18:
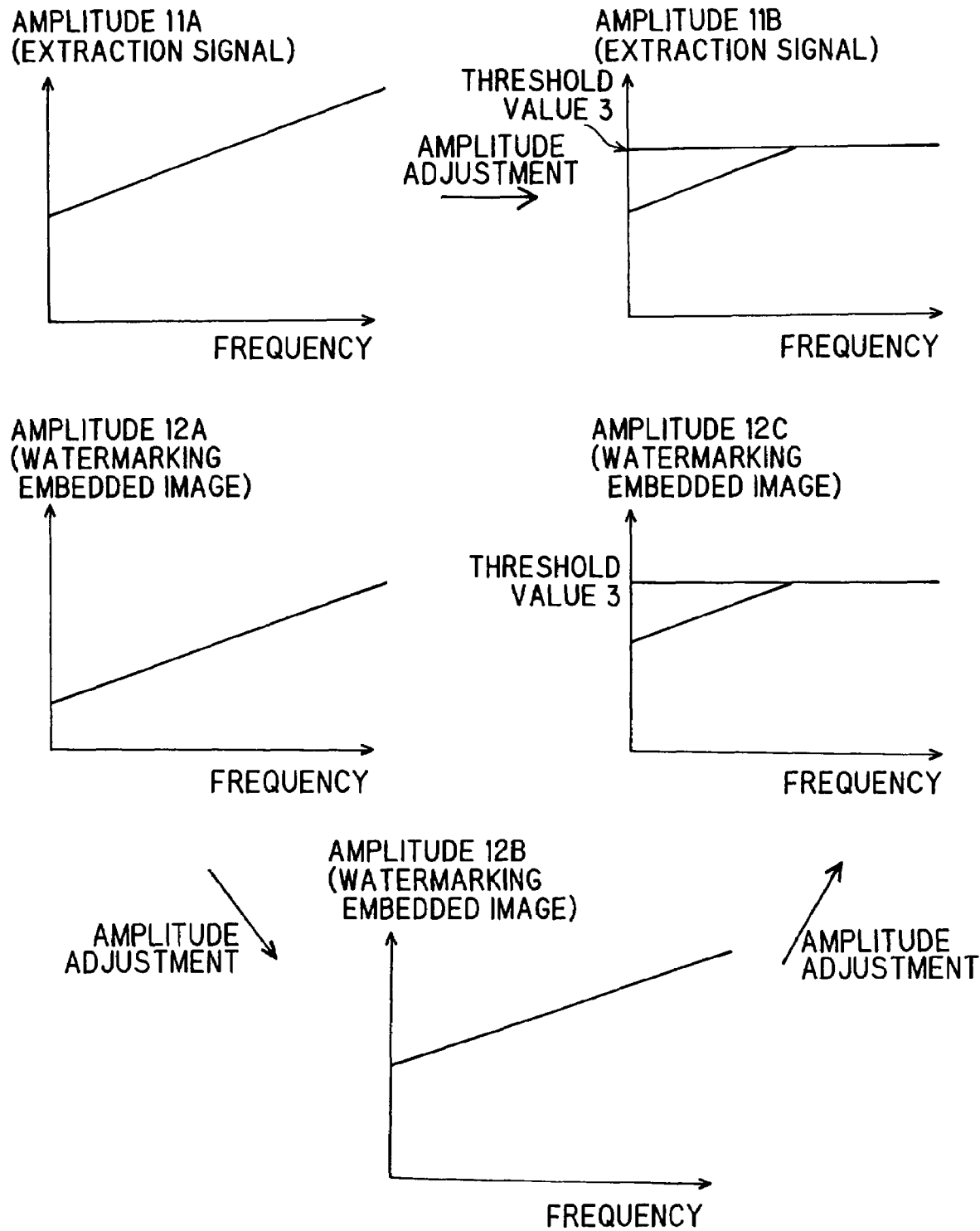
FIG. 18 is a diagram showing a sixth amplitude adjusting method.

FIG. 18 is a diagram showing an example of the amplitude adjustment in which the amplitude of the orthogonally-transformed image of the extraction signal or the watermarking embedded image is subjected to constant number multiplication or added with a constant to make the two amplitudes equal to each other in average or power, and when the two amplitudes exceed the same specific threshold value, they are fixed to the threshold value.

The average value of the amplitude 11A of the extraction signal is compared with the average value of the amplitude 12A of the watermarking embedded image, and a constant is added to the amplitude 12A of the watermarking embedded image so that the average value of the amplitude 12A of the watermarking embedded image is equal to the average value of the amplitude 11A of the extraction signal. It is judged whether each of the amplitude 11A of the extraction signal and the amplitude 12B of the watermarking embedded image exceeds a threshold value 3. If the amplitude exceeds the threshold value 3, the amplitude is fixed to the threshold value 3, so that the amplitude 11B of the extraction signal and the amplitude 12C of the watermarking embedded image are achieved.

The power of the amplitude may be used in place of the average value of the amplitude, and also the constant number multiplication may be used in place of the addition of the constant.

Furthermore, the amplitude is compared with the threshold over all the frequency band, however, the same amplitude adjustment may be carried out in some specific frequency band.

(2-2-7) Seventh Amplitude Adjusting Method

A seventh amplitude adjusting method for the amplitudes of the orthogonally-transformed images of the extraction signal and the watermarking embedded images will be described with reference to FIG. 12.

Figure 12:
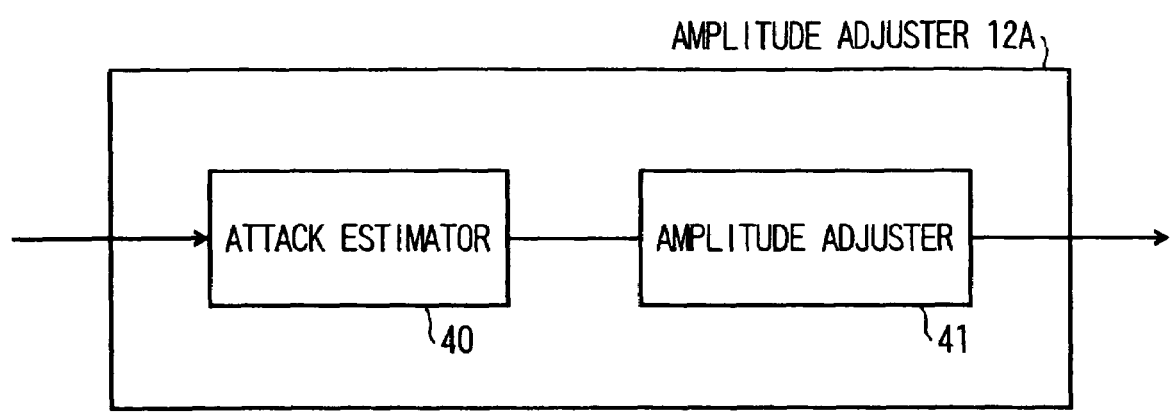
FIG. 12 is a diagram showing a seventh amplitude adjusting method.

FIG. 12 is a diagram showing an example of the amplitude adjuster 12A.

With respect to the extraction signal input to the amplitude adjuster 12A, an attack which the watermarking embedded image has suffered is estimated by the attack estimator 40. That is, the variation applied to the watermarking embedded image is estimated on the basis of the amplitude characteristic. The amplitude is adjusted in conformity with the estimated attack by the amplitude adjuster 41, and then output from the amplitude adjuster 12A.

As described above, the amplitude is varied in conformity with each of assumed attacks, whereby the resistance to each attack can be enhanced.

In this embodiment, the attack estimator is contained in the amplitude adjuster 12A, however, the attack estimator may be disposed out of the amplitude adjuster 12A. When a predicted attack is restricted, the amplitude adjustment may be carried out without estimating any attack.

Furthermore, the same function may be provided to not only the amplitude adjuster 12A, but also the amplitude adjuster 12B.

Still furthermore, plural amplitude adjusters may be provided, and an amplitude adjuster to be selected from these amplitude adjusters may be changed in accordance with the type of an assumed attack. The number of amplitude adjusters to be selected is not limited, and it may be set in conformity with the types of assumed attacks.

(2-2-8) Eighth Amplitude Adjusting Method

The above seven adjusting methods may be successively applied to the watermarking embedded image, and the phase adjusting method having the highest correlation may be afterwards used.

(2-2-9) Other Amplitude Adjusting Methods

The eight examples of the amplitude adjusting method have been described above, and the amplitude adjustment may be carried out by any combination of these examples.

(3) Calculation Amount in Orthogonal Transformation

Here, the calculation amount in the orthogonal transformation when FFT (Fast Fourier Transform) is used for the orthogonal transformation of this embodiment will be described. It is assumed that an input image comprises N lines and M columns.

The calculation amount of two-dimensional FFT is as follows.

$$\frac{1}{2} \times N \times M \times (\text{Log}M + \text{Log}N)$$

Furthermore, in this embodiment, the following calculation amount is needed because three orthogonal transformations (first orthogonal transformation/second orthogonal transformation of two images) are used.

$$\frac{3}{2} \times N \times M \times (\text{Log}M + \text{Log}N)$$

(4) Procedure of Digital Watermarking Detecting Method

Figure 3:
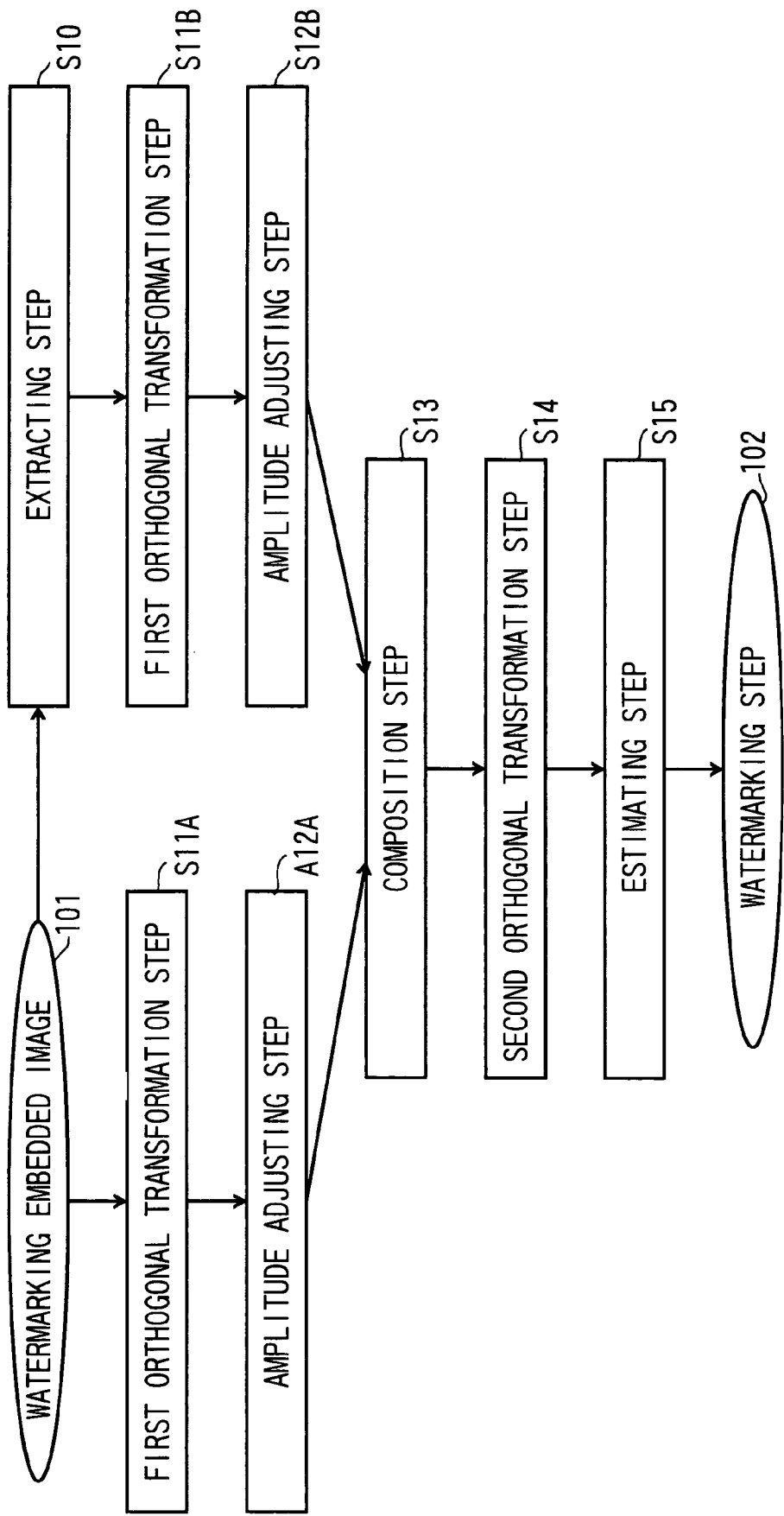
FIG. 3 is a flowchart showing the procedure of a digital watermarking detecting method according to the first embodiment.

Next, the procedure of the digital watermarking detecting method according to this embodiment will be described with reference to the flowchart of FIG. 3.

Only the specific frequency component is extracted from the watermarking embedded image signal 101 in extraction step S10. This step corresponds to the digital filter having the same frequency area as the specific frequency component extractor used in the digital watermarking embedding step to be paired as described above.

The signal extracted in the extraction step S10 is subjected to orthogonal transformation processing such as Fourier Transform or the like in the first orthogonal transformation step S11B. The watermarking embedded image signal 101 is subjected to orthogonal transformation processing such as Fourier Transform or the like in the first orthogonal transformation step S11A.

The amplitude component of the first orthogonal transformation step S11A is adjusted in amplitude in the amplitude adjusting step S12A so as to approach to the amplitude component of the first orthogonal transformation step S11B. Likewise, the amplitude component of the first orthogonal transformation step S11B is adjusted in amplitude in the amplitude adjusting step S12B so that the difference thereof from the amplitude component of the first orthogonal transformation step S11A is suppressed to a predetermined range.

The two signals after the amplitude adjustment are subjected to complex composition in a composition step S13.

The orthogonal transformation or the inverse orthogonal transformation is carried out on the signal after the complex composition in the second orthogonal transformation step S14. The orthogonal transformation in this case is required to be paired with the transformation in the first orthogonal transformation. When Fourier Transform is used as the first orthogonal transformation, the second orthogonal transformation uses Fourier Transform or Inverse Fourier Transform.

The data after the second orthogonal transformation is supplied to an input in estimating step S15. In the estimating step S15 of the watermarking information, the peak of the mutual correlation value is searched while phase-shifting is carried out as shown in FIGS. 9 and 10, whereby the water information is estimated and detected. When the variation of the correlation value is viewed, a peak appears at the position of some phase shift amount, and the polarity of this peak represents the watermarking information 102.

(5) Construction of Digital Watermarking Detecting Program

Figure 5:
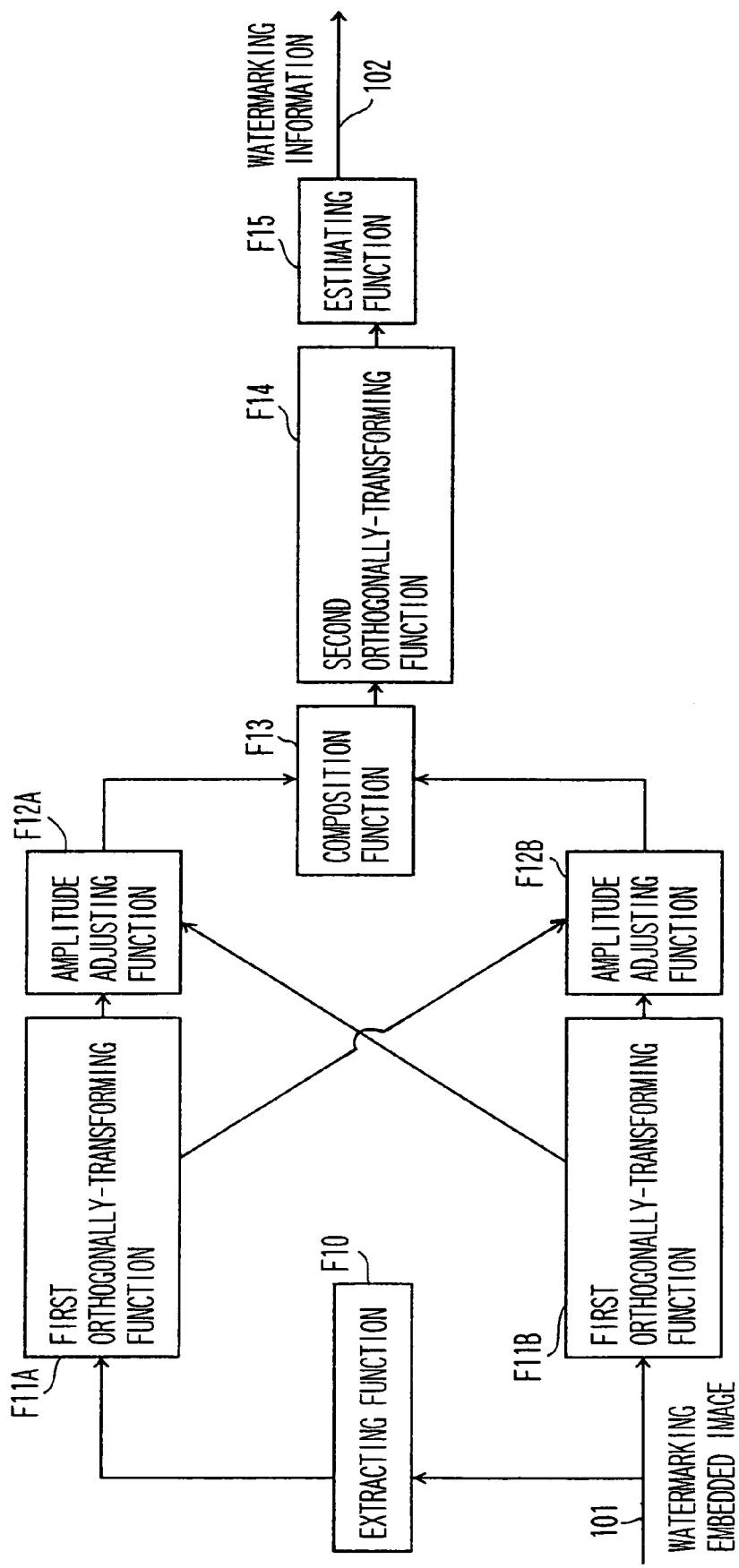
FIG. 5 is a block diagram showing the construction of a digital watermarking detecting program according to the first embodiment.

Next, the construction of the digital watermarking detecting program according to the embodiment will be described with reference to FIG. 5.

Only the specific frequency component is extracted from the watermarking embedded image signal 101 by an extraction function F10. The extraction function is a digital filter having the same frequency band as the specific frequency component extraction function used for the digital watermarking embedding operation, which is paired with the extraction function.

The extraction signal extracted by the extraction function F10 is subjected to the orthogonal transformation processing such as Fourier Transform by a first orthogonal transformation function F11B. The watermarking embedded image signal 101 is subjected to the orthogonal transformation processing such as Fourier Transform by the first orthogonal transformation function F11A.

The amplitude component of the first orthogonal transformation function F11A is adjusted in amplitude by an amplitude adjusting function F12A so that the difference thereof from the amplitude component of the first orthogonal transformation function F11B is suppressed to a predetermined range, and likewise the amplitude component of the first orthogonal transformation function F11B is adjusted in amplitude by an amplitude adjusting function F12B so as to approach to the amplitude component of the first orthogonal transformation function F11A.

The two signals after the amplitude adjustment are subjected to complex composition by a composition function F13.

The signal after the complex composition is subjected to orthogonal transformation or inverse orthogonal transformation by a second orthogonal transformation function F14. The orthogonal transformation at this time is required to be paired with the transformation in the first orthogonal transformation, and when Fourier Transform is used as the first orthogonal transformation, Fourier Transform or inverse Fourier Transform is used as the second orthogonal transformation.

The data after the second orthogonal is supplied to the input of an estimating function F15. The estimating function F15 of the watermarking information estimates and detects the watermarking information by searching the peak of the mutual correlation value while phase shift is carried out as shown in FIGS. 9 and 10. When the variation of the correlation value is viewed, a peak appears at some phase shift amount, and the polarity of this peak represents the watermarking information 102.

(6) Hardware Construction of Digital Watermarking Detecting Device

Figure 19:
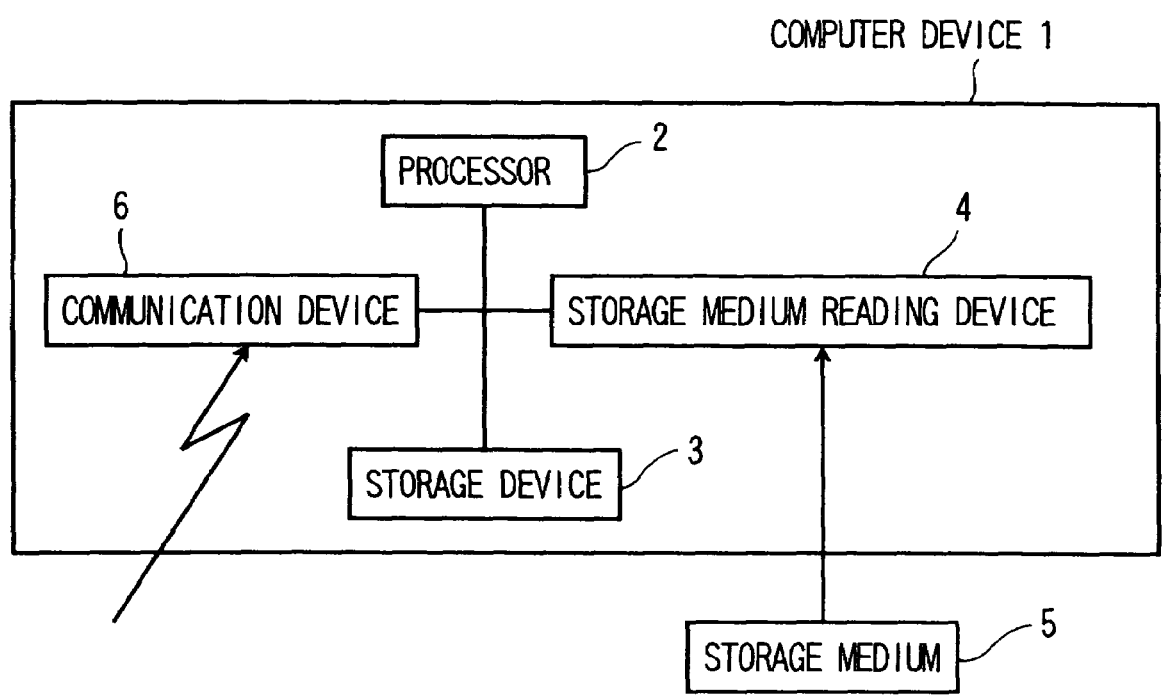
FIG. 19 is a diagram showing a hardware construction of the digital watermarking detecting device according to the first and second embodiments.

The digital watermarking detecting device can be also implemented by using a general-purpose computer device 1 shown in FIG. 19 as basic hardware.

That is the extracting function, the first orthogonal transformation function, the amplitude adjusting function, the composition function, the second orthogonal transformation function and the estimating function can be implemented by making a processor 2 installed in the computer device execute a program.

At this time, the digital watermarking detecting device may be implemented by installing the above program in a storage device 3 such as the memory of the computer device, a hard disc or the like in advance, or achieved by storing the program in a recording medium 5 such as CD-ROM or the like and achieving the program from a storage medium reading device 4, or implemented by distributing the program through a network and properly installing the program from a communication device 6 into the computer device.

Furthermore, the watermarking embedded image signal may be achieved by properly utilizing the storage device 3 such as a memory installed in or externally provided to the computer device 1 a hand disk or the storage medium 5 such as CD-R, CD-RW, DVD-RAM, DVD-R or the like. Furthermore, the watermarking embedded image signal may be achieved from other devices (for example, a computer, a server, etc.) connected to the network through the communication device 6.

SECOND EMBODIMENT

A digital watermarking embedding device and a digital watermarking detecting device according to a second embodiment of the present invention will be described.

(Digital Watermarking Embedding Device)

First, the digital watermarking embedding device according to the second embodiment will be described with reference to FIGS. 8 and 9.

Figure 8:
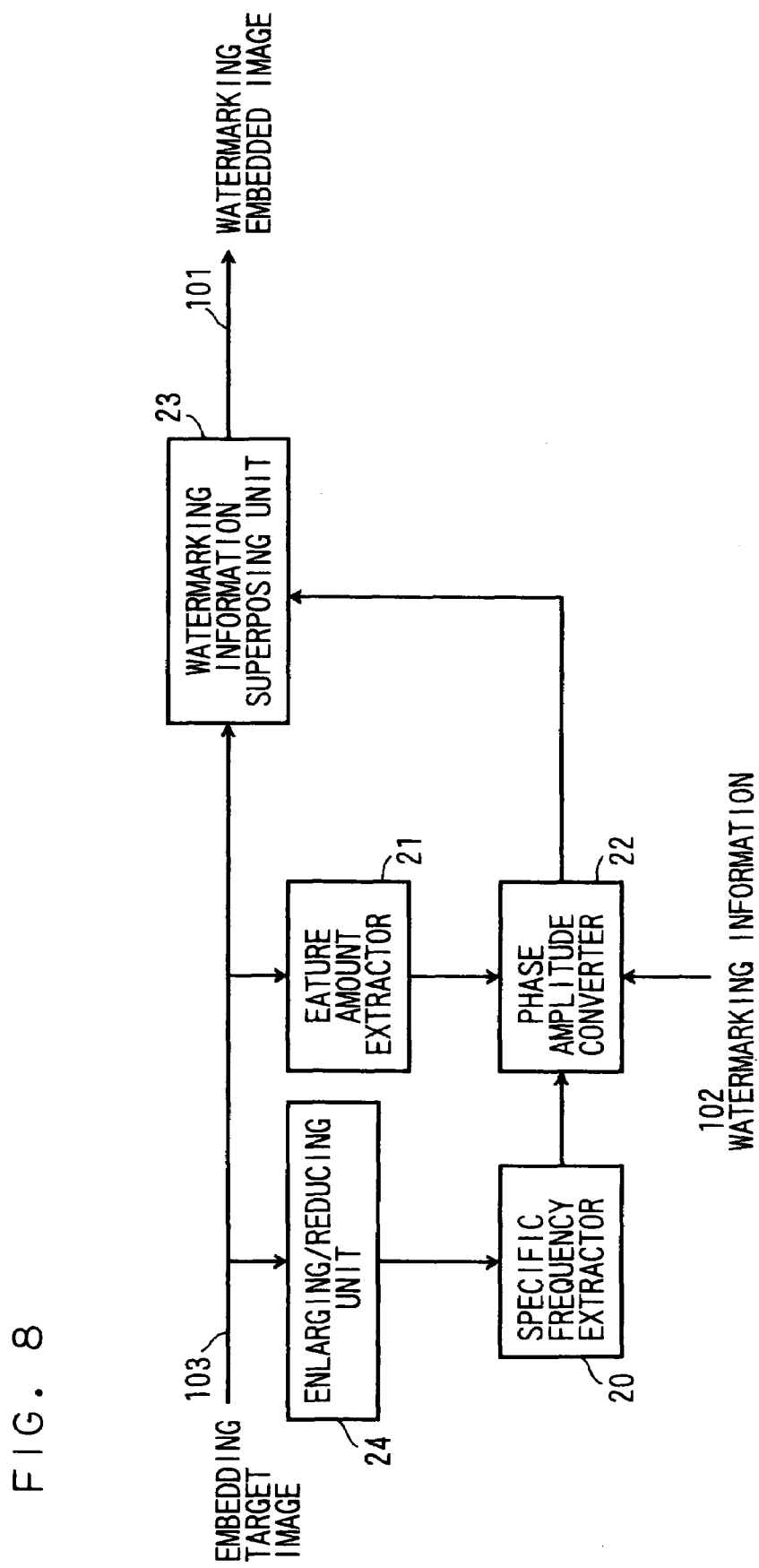
FIG. 8 is a block diagram showing the construction of a digital watermarking embedding device according to the second embodiment.

FIG. 8 is a block diagram showing the basic construction of the digital watermarking embedding device.

In the digital watermaking embedding device, a digitalized image signal of a motion picture or still picture is input as an embedding target image 103 corresponding to an image in which watermarking information should be embedded. The embedding target image signal 103 may contain both a brightness signal and a color difference signal, or it may contain only the brightness signal. The embedding target image signal 103 is branched into three parts, and they are input to an enlarging/reducing unit 16, a feature amount extractor 21 and a watermarking information superposing portion 23.

The enlarging/reducing unit 16 comprises a digital filter having a frequency band, and generates an enlarged/reduced component having a specific scaling rate, for example, a magnifying power of 0.5 from the embedding target image signal 103. In the following description, the output signal from the enlarging/reducing unit 16 will be referred to as "enlarged/reduced signal". The enlarged/reduced signal output from the enlarging/reducing unit 16 is input to the specific frequency component extractor 20.

The specific frequency component extractor 20 comprises a digital filter having a frequency band, for example, a low pass filter or high pass filter that has a predetermined cut-off frequency, or a band pass filter having a predetermined pass-band center frequency, and extracts a specific frequency component, for example, a relatively high frequency component from the embedding target image signal 103. In the following description, the output signal from the specific frequency component extractor 20 will be referred to as "specific frequency component signal".

The specific frequency component signal output from the specific frequency component extractor 20 is converted in phase and amplitude by the phase and amplitude converter 22. Here, only the phase may be converted or only the amplitude may be converted. Watermarking information 102 corresponding to digital information to be embedded in the embedding target image signal 103 is supplied to the phase and amplitude converter 22.

The phase and amplitude converter 22 is designed so as to subject a specific frequency component signal to phase conversion of a predetermined inherent phase conversion amount and amplitude conversion of a predetermined inherent amplitude conversion amount. Specifically, the phase conversion of the phase and amplitude converter 22 is implemented by a single or plural digital phase shifters, and the phase conversion amount corresponds to the phase shift amount of the phase shifters. FIG. 9 is a diagram showing the aspect of the phase shift by a phase converter 112. In this case, the specific frequency component signal is simply phase-shifted while keeping the waveform thereof. Specifically, the amplitude conversion of the phase and amplitude converter 22 comprises a single or plural exclusive OR circuits or digital multipliers, and the amplitude conversion amount is an efficient to be multiplied to the specific frequency component signal to be input. The watermarking information 102 is input to the phase and amplitude converter 22, and the phase conversion amount (phase shift amount) of the phase and amplitude converter 22 and the amplitude conversion amount (coefficient) are controlled according to the watermarking information 102.

Furthermore, the feature amount of the embedding target image signal 103, for example, activity representing the complexity degree of an image by the feature amount extractor 21. The information on the feature amount is input to the phase and amplitude converter 22. In the phase and amplitude converter 22, the phase conversion amount (phase shift amount) and the amplitude conversion amount (coefficient) are controlled in accordance with the feature amount thus input. The feature amount extractor 21 is not indispensable and it may be omitted.

The specific frequency component signal that is subjected to phase conversion and amplitude conversion by the phase and amplitude converter 22 is supplied as an embedding signal by a watermarking information superposing portion 23 comprising a digital adder, and superposed on the embedding target image signal 103. That is, the specific frequency component signal extracted by the enlarging/reducing unit 16/the specific frequency component extractor 20 is subjected to phase conversion and amplitude conversion inherent to the digital watermarking embedding device by the phase and amplitude converter 22, and also one or both of the phase conversion and the amplitude conversion amount are controlled by the watermarking information 102, and a watermarking embedded image 101 in which the watermarking information 102 is embedded in the embedding target image signal 103 is generated in the watermarking information superposing portion 23.

The specific frequency component signal which is extracted by the specific frequency component extractor 20 and converted in phase and amplitude by the phase and amplitude converter 22 may exist over plural channels. In this case, the specific frequency component signals of the plural channels are superposed on the embedding target image signal 103 in the watermarking information superposing portion 23.

The watermarking embedded image signal 101 corresponding to the image signal embedded with the watermarking information as described above is recorded by a digital image recording and reproducing device such as a DVD system or the like, or transmitted through a transmission medium such as the Internet, a broadcast satellite, a communication satellite or the like.

(Digital Watermarking Detecting Device)

An embodiment of a digital watermarking detecting device when the watermarking embedded image signal 101 is detected will be described hereunder with reference to the drawings.

The digital watermarking detecting device according to the second embodiment will be described with reference to FIGS. 2, 4, 6, 9 to 11 and 19.

(1) Construction of Digital Watermarking Detecting Device

Figure 2:
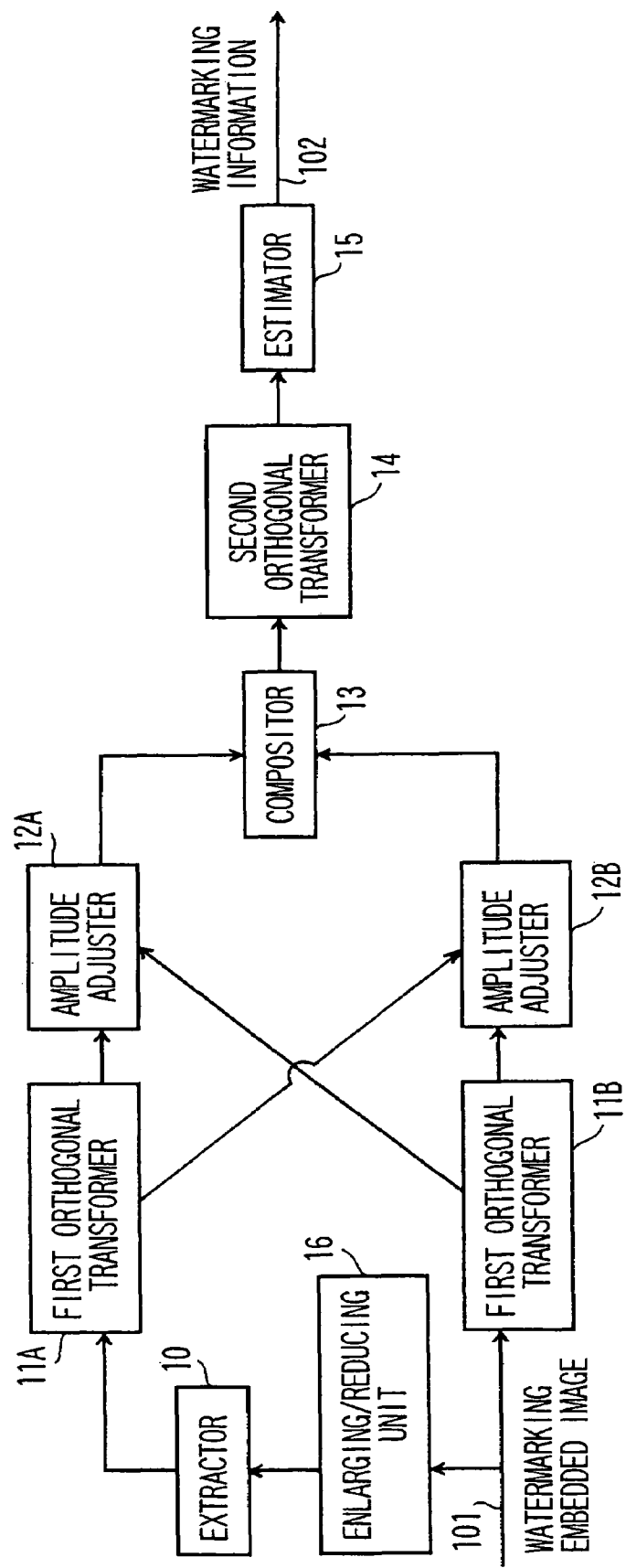
FIG. 2 is a block diagram showing the construction of a digital watermarking detecting device according to a second embodiment of the present invention.

FIG. 2 shows the construction of the digital watermaking embedding device according to this embodiment.

A watermarking embedded image signal 101 in which a specific frequency component signal is controlled and embedded according to watermarking information 102 by the digital watermarking embedding device described above is input to the digital watermarking detecting device of FIG. 2 through a recording medium or transmission medium. It is assumed that a digital signal of "1" or "0" is embedded as the watermarking information.

The watermarking embedded image signal 101 is enlarged/reduced at the same scaling rate as used in the digital watermarking embedding device described above by the enlarging/reducing unit 16. Only a specific component is extracted from the enlarged/reduced signal by the extractor 10. The extractor comprises a digital filter having the same frequency area as the specific frequency component extractor used in the digital watermarking embedding device, for example, a low pass filter or high pass filter that has a predetermined cut-off frequency, or a band pass filter having a predetermined passband center frequency, and it extracts an extraction signal of a specific frequency component, for example, a relatively high frequency component from the watermarking embedded image signal 101.

The extraction signal extracted by the extractor 10 is subjected to orthogonal transformation processing such as orthogonal transformation or the like by the first orthogonal transformer 11A, and the watermarking embedded image signal 101 is subjected to orthogonal transformation processing such as orthogonal transformation or the like by the first orthogonal transformer 11B. There may be also considered such a situation that the extractor extracts all the frequency components.

The amplitude component of the first orthogonal transformer 11A is adjusted in amplitude by the amplitude adjuster 12A so that the difference thereof from the amplitude component of the first orthogonal transformer 11B is suppressed to a predetermined range, and likewise the amplitude component of the first orthogonal transformer 11B is adjusted in amplitude by the amplitude adjuster 12B so as to approach to the amplitude component of the first orthogonal converter 11A.

The two signals after the amplitude adjustment are subjected to complex composition by the compositor 13.

The composite signal after the complex composition is subjected to orthogonal transformation or inverse orthogonal transformation by the second orthogonal transformer 14. The orthogonal transformation at this time is required to be paired with the transformation in the first orthogonal transformation, and when Fourier Transform is used in the first orthogonal transformation, Fourier Transform or inverse Fourier Transform is used in the second orthogonal transformation.

The composite signal after the second orthogonal transformation is supplied to the input of the estimator 15. A method of the estimator 15 estimating the watermarking information 102 from the composite signal after the transformation will be described with reference to FIGS. 9 and 10. A digital signal of "1" or "0" is embedded as the watermarking information described above.

As shown in FIG. 9, the correlation between the composite signal after the transformation and the original non-phase-shifted composite signal after the transformation is taken while the composite signal concerned is phase-shifted. The relationship between the mutual correlation value and the phase shift amount is shown in FIG. 10.

As shown in FIG. 10, when variation of the mutual correlation value is observed, a peak appears at the position of some phase shift amount, and the polarity of the peak represents the watermarking information 102. For example, when the watermarking embedded image signal 101 is suffering a scaling attack, the phase shift amount of the specific frequency component signal thus attacked is made different from the phase shift amount given to the specific frequency component signal in the digital watermarking embedding device.

Therefore, in this embodiment, the phase shift amount is continuously or stepwise controlled by the estimator 15, a peak of the mutual correlation value output in connection with the above control is searched, and the watermarking information is estimated and detected on the basis of the polarity of the peak thus searched. The peak of the mutual correlation value takes one of positive and negative values in accordance with the value of the watermarking information. For example, in the case of FIG. 10, when the peak has a positive value, the watermarking information is judged as "1". When the peak has a negative value, the watermarking information is judged as "0". As described above, for the image suffering the scaling attack, the watermarking information 102 detected by the estimator 15 is output.

As described above, according to this embodiment, the extraction signal is extracted from the signal achieved by enlarging/reducing the watermarking embedded image signal, and the watermarking information is detected from the correlation result of the phase restricted correlation between the extraction signal and the watermarking embedded image signal through the mutual correlation. In this case, the correlation calculation is carried out while varying the phase, whereby the peak of the correlation value can be searched. Therefore, the watermarking information can easily be detected from the embedded image signal suffering the scaling attack as well.

Here, the same amplitude adjusting method as described with respect to the first embodiment can be used as the amplitude adjusting unit of the phase restricted correlation.

(2) Procedure of Digital Watermarking Detecting Method

Figure 4:
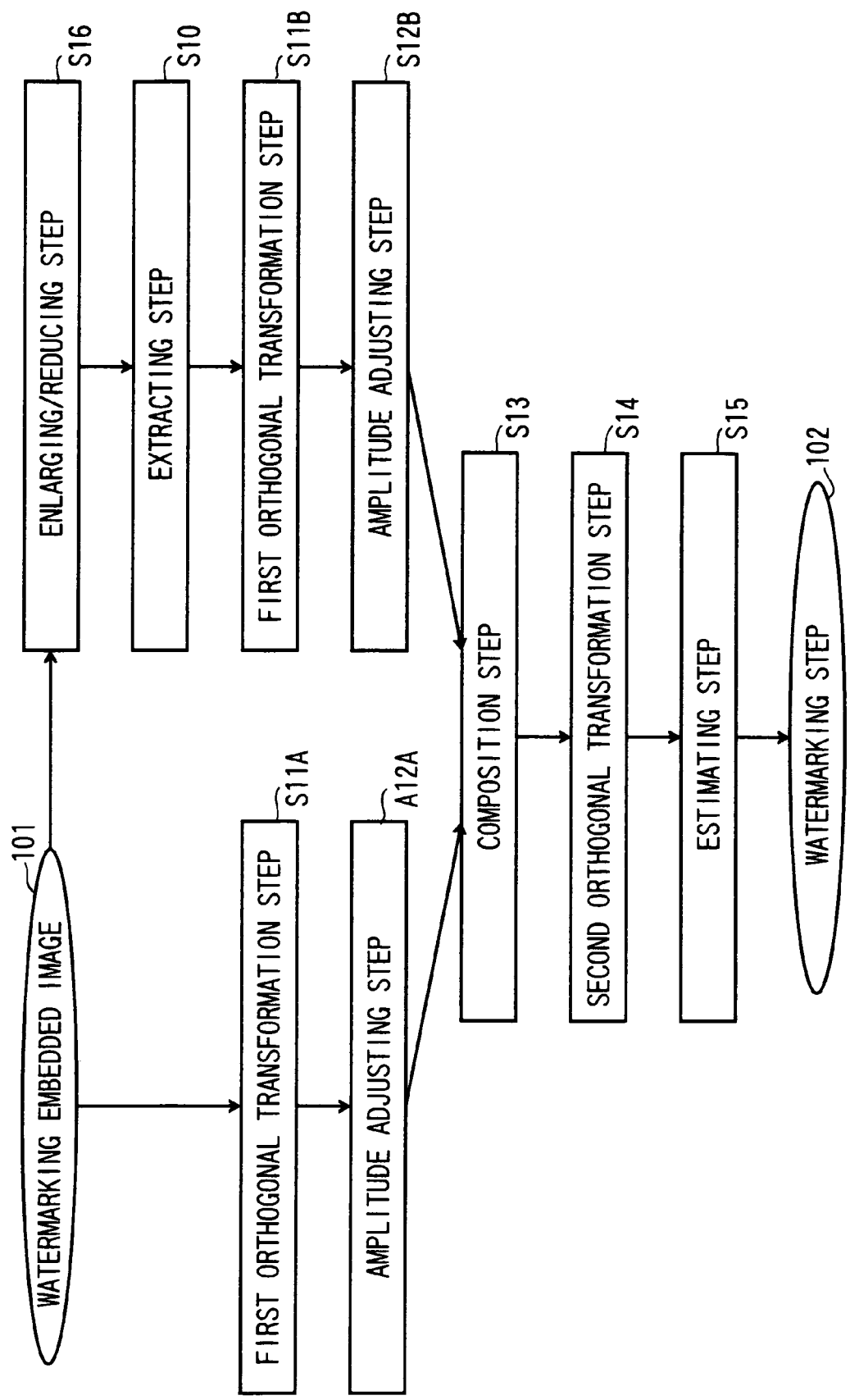
FIG. 4 is a flowchart showing the procedure of a digital watermarking detecting method according to the second embodiment.

The procedure of the digital watermarking detecting method according to this embodiment will be described with reference to the flowchart of FIG. 4.

In enlarging/reducing step S16, a watermarking embedded image signal 101 is enlarged/reduced in the same scaling rate as used in the digital watermarking embedding device described above. Only a specific component is extracted from the enlarged/reduced signal in extraction step S10. Only the specific frequency component is extracted in the extraction step S10. This extraction step is a digital filter having the same frequency band as the specific frequency component extractor used in the digital watermarking embedding operation which is paired with the extraction step.

The extraction signal extracted by the extraction step S10 is subjected to orthogonal transformation processing such as Fourier Transform or the like by a first orthogonal transformation step S11B. The watermarking embedded image signal 101 is subjected to orthogonal transformation processing such as Fourier Transform or the like by a first orthogonal transformation step S11A. The amplitude component of the first orthogonal transformation step S11A is adjusted in amplitude by an amplitude adjusting step S12A so that the difference thereof from the amplitude component of the first orthogonal transformation step S11B is suppressed to a predetermined range, and likewise the amplitude component of the first orthogonal transformation step S11B is adjusted in amplitude by an amplitude adjusting step S12B so as to approach to the amplitude component of the first orthogonal transformation step S11A.

The two signals after the amplitude adjustment are subjected to complex composition by the composition step S13.

The signal after the complex composition is subjected to orthogonal transformation or inverse orthogonal transformation by the second orthogonal transformation step S14. The orthogonal transformation at this time is required to be paired with the orthogonal transformation in the first orthogonal transformation. When Fourier Transform is used in the first orthogonal transformation, Fourier Transform or inverse Fourier Transform is used in the second orthogonal transformation.

The data after the second orthogonal transformation are supplied to the input of the estimating step S15. The estimating step S15 of the watermarking information estimates and detects watermarking information by searching the peak of the mutual correlation value while shifting the phase as shown in FIGS. 9 and 10. When the variation of the correlation value is viewed, a peak appears at some phase shift amount, and the polarity of the peak represents the watermarking information 102.

(3) Construction of Digital Watermarking Detecting Program

Figure 6:
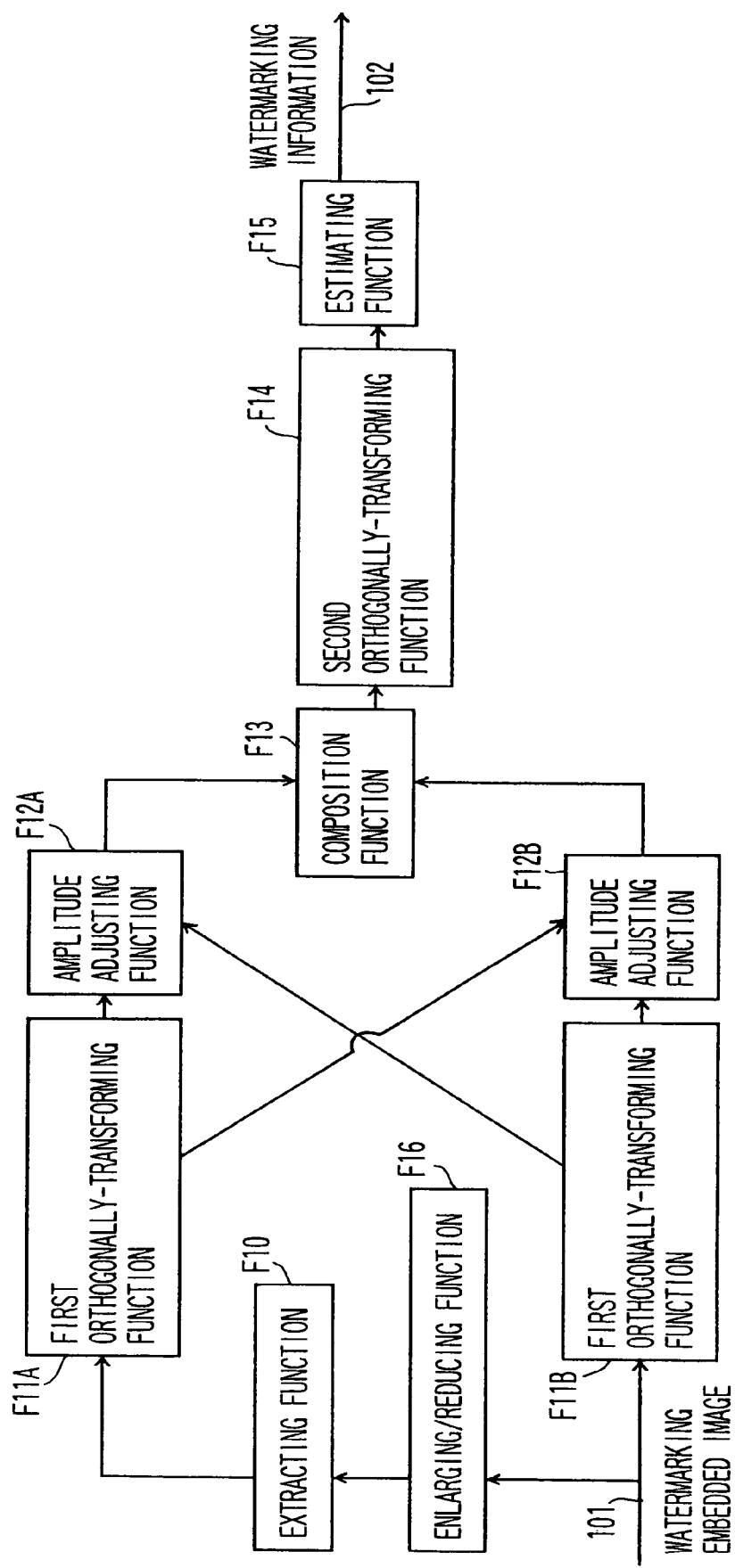
FIG. 6 is a block diagram showing the construction of a digital watermarking detecting program according to the second embodiment.

Next, the construction of a digital watermarking detecting program according to this embodiment will be described with reference to FIG. 6.

The watermarking embedded image signal 101 is enlarged/reduced in the same scaling rate as used in the digital watermarking embedding device described above by an enlarging/reducing function F16. Only a specific component is extracted from the enlarged/reduced signal by the extracting function a F10. Only a specific frequency component is extracted by the extracting function F10. The extracting function is a digital filter having the same frequency band as the specific frequency component extracting function used in the digital watermarking embedding operation which is paired with the extracting function.

The extraction signal extracted by the extracting function F10 is subjected to orthogonal transformation processing such as Fourier Transform or the like by the first orthogonal transformation function F11B. The watermarking embedded image signal 101 is subjected to orthogonal transformation processing such as Fourier Transform or the like by the first orthogonal transformation function F11A.

The amplitude component of the first orthogonal transformation function F11A is adjusted in amplitude by the amplitude adjusting function F12A so that the difference thereof from the amplitude component of the first orthogonal transformation function F11B is suppressed to a predetermined range, and likewise the amplitude component of the first orthogonal transformation function F11B is adjusted in amplitude by the amplitude adjusting function F12B so as to approach to the amplitude component of the first orthogonal transformation function F11A.

The two signals after the amplitude adjustment are subjected to complex composition by the composition function F13.

The signal after the complex composition is subjected to orthogonal transformation or inverse orthogonal transformation by the second orthogonal transformation function F14. The orthogonal transformation at this time is required to be paired with the transformation in the first orthogonal transformation, and when Fourier Transform is used in the first orthogonal transformation, Fourier Transform or inverse Fourier Transform is used in the second orthogonal transformation.

The data after the second orthogonal transformation is supplied to the input of the estimating function F15. The estimating function F15 of the watermarking information estimates and detects the watermarking information by searching the peak of the mutual correlation value while shifting the phase as shown in FIGS. 9 and 10. When the variation of the correlation value is viewed, a peak appears at some phase shift amount, and the polarity of this peak represents the watermarking information 102.

(4) Hardware Construction of Digital Watermarking Detecting Device

The digital watermarking detecting device of this embodiment may be implemented by using a general-purpose computer device 1 shown in FIG. 19 as basic hardware as in the case of the first embodiment.

[Modification]

The present invention is not limited to the above-described embodiments, and various modifications and alterations may be made without departing from the subject matter of the present invention. Furthermore, plural constituent elements disclosed in the above embodiments may be properly combined to implement the present invention. For example, some constituent elements may be deleted from all the constituent elements disclosed in the above embodiments. Furthermore, constituent elements of different embodiments may be properly combined.

INDUSTRIAL APPLICABILITY

The present invention is suitably applicable to a device for recording and reproducing digital image data such as a digital VTR, DVD or the like.

What is claimed is:

1. A digital watermarking detecting device, which detects from a watermarking-embedded image watermarking information that is electrically embedded therein and used in converting a specific frequency component signal extracted from an embedding target image, comprising:
    an extracting processor configured to extract an extraction signal of the specific frequency component from the watermarking-embedded image by an extraction method same with that of a digital watermarking embedding device;
    a first orthogonal transforming processor configured to calculate a primary orthogonally-transformed image by orthogonal transformation of the extraction signal and a secondary orthogonally-transformed image by orthogonal transformation of the watermarking-embedded image;
    an amplitude adjusting processor configured to adjust amplitude of each or either of the primary and secondary orthogonally-transformed images in accordance with a difference between amplitude components of the primary and secondary orthogonally-transformed images;
    a composition processor configured to combine the primary and secondary orthogonally-transformed images thus adjusted in amplitude to provide a composite signal;
    a second orthogonal transforming processor configured to subject the composite signal to orthogonal transformation or inverse orthogonal transformation to provide a second orthogonally-transformed signal; and
    a watermarking information estimating processor configured to estimate the watermarking information on the basis of a peak appearing in the second orthogonally-transformed signal.

2. The digital watermarking detecting device according to claim 1,
    further comprising an enlarging/reducing processor configured to carry out an enlarging/reducing processing same with that of the digital watermarking embedding device to achieve an enlarged/reduced signal from the watermarking embedded image; so that the specific frequency component signal is extracted from an enlarged/reduced component of the embedding target image, and the extracting processor extracts the extraction signal from the enlarged/reduced signal by using the extraction method same with that of the digital watermarking embedding device.

3. The digital watermarking detecting device according to claim 1, wherein the orthogonal transformation is Fourier Transform.

4. The digital watermarking detecting device according to claim 1, wherein the amplitude adjusting processor suppresses the amplitude difference between the primary and secondary orthogonally-transformed images within a predetermined range.

5. The digital watermarking detecting device according to claim 1, wherein the amplitude adjusting processor unit suppresses a gradient difference between the amplitudes of the two orthogonally-transformed images within a predetermined range.

6. The digital watermarking detecting device according to claim 1, wherein when, at a certain frequency, a magnitude of the amplitude of the primary or secondary orthogonally-transformed image is smaller than a first threshold value, the amplitude adjusting processor makes the magnitude of the amplitude of each of the primary and secondary orthogonally-transformed images smaller than a second threshold value at said certain frequency.

7. The digital watermarking detecting device according to claim 4, wherein the amplitude adjusting processor applies a filtering to an amplitude component of the primary or secondary orthogonally-transformed image.

8. The digital watermarking detecting device according to claim 1, wherein when the amplitude of the secondary orthogonally-transformed image exceeds a first threshold value, the amplitude adjusting processor fixes the amplitude of the secondary orthogonally-transformed image to the first threshold value; and when the amplitude of the primary orthogonally-transformed image exceeds a second threshold value different from the first threshold value, the amplitude adjusting processor fixes the amplitude of the primary orthogonally-transformed image to the second threshold value.

9. The digital watermarking detecting device according to claim 1, wherein the amplitude of the primary or secondary orthogonally-transformed image is subjected to constant number multiplication or added with a constant, so that the amplitudes of the primary and secondary orthogonally-transformed images are set to be equal to each other in average or power; and when the amplitudes are thus set to be equal, and the primary and secondary orthogonally-transformed images have some portions exceeding a common specific threshold value, the amplitudes of the exceeding portions concerned are fixed to the common specific threshold value.

10. The digital watermarking detecting device according to claim 1, further comprising an attack estimating processor configured to estimate a variation applied to the watermarking embedded image on the basis of the amplitude characteristic of the watermarking-embedded image; so that the amplitude adjusting processor adjusts amplitude of each or either of the primary and secondary orthogonally-transformed images in conformity with the variation thus estimated.

11. The digital watermarking detecting device according to claim 1, wherein the amplitude adjusting processor adjusts amplitude of each or either of the primary and secondary orthogonally-transformed images on the basis of plural amplitude adjusting methods for such adjusting, and selects an amplitude adjusting method providing the highest peak in the second orthogonally-transformed signal from the plural amplitude adjusting methods.

12. A program, embodied on a computer readable medium, for detecting from a watermarking-embedded image watermarking information that is electrically embedded therein and used in converting a specific frequency component signal extracted from an embedding target image, comprising instructions of:

extracting an extraction signal of the specific frequency component from the watermarking-embedded image by an extraction method same with that of a digital watermarking embedding device;

calculating a primary orthogonally-transformed image from the extraction signal and a secondary orthogonally-transformed image from the watermarking-embedded image;

adjusting amplitude of each or either of the primary and secondary orthogonally-transformed images in accordance with a difference between amplitude components of the primary and secondary orthogonally-transformed images;

combining the primary and secondary orthogonally-transformed images thus adjusted in amplitude to provide a composite signal;

subjecting the composite signal to orthogonal transformation or inverse orthogonal transformation to provide a second orthogonally-transformed signal; and estimating the watermarking information on the basis of a peak appearing in the second orthogonally-transformed signal.

* * * * *